US012132824B2

(12) United States Patent
Armleder

(10) Patent No.: US 12,132,824 B2
(45) Date of Patent: Oct. 29, 2024

(54) METHOD FOR ISSUANCE OF A PERSONALIZED USER DEVICE

(71) Applicant: Sebastien Armleder, Carouge (CH)

(72) Inventor: Sebastien Armleder, Carouge (CH)

(73) Assignee: Sebastien Armleder, Carouge (CH)

( * ) Notice: Subject to any disclaimer, the term of this patent is extended or adjusted under 35 U.S.C. 154(b) by 0 days.

(21) Appl. No.: 18/419,304

(22) Filed: Jan. 22, 2024

(65) Prior Publication Data

US 2024/0283634 A1 Aug. 22, 2024

(30) Foreign Application Priority Data

Feb. 22, 2023 (EP) .................................. 23157971

(51) Int. Cl.
*H04L 9/40* (2022.01)
*H04L 9/08* (2006.01)
*H04L 9/32* (2006.01)

(52) U.S. Cl.
CPC .......... *H04L 9/0825* (2013.01); *H04L 9/0822* (2013.01); *H04L 9/0869* (2013.01); *H04L 9/3247* (2013.01)

(58) Field of Classification Search
CPC ... H04L 9/0825; H04L 9/0822; H04L 9/0869; H04L 9/3247
See application file for complete search history.

(56) References Cited

U.S. PATENT DOCUMENTS

| 6,014,748 | A | 1/2000 | Tushie et al. |
| 8,719,952 | B1* | 5/2014 | Damm-Goossens ........................ H04L 9/3226 726/28 |
| 10,635,495 | B2* | 4/2020 | Maurer .............. G06Q 20/3825 |
| 11,568,693 | B2* | 1/2023 | Grzenda ................. E05B 67/22 |
| 11,711,213 | B2* | 7/2023 | Velagapalli ......... H04L 63/0823 713/189 |
| 2008/0005567 | A1 | 1/2008 | Johnson |

(Continued)

FOREIGN PATENT DOCUMENTS

CN 108229202 A 6/2018

OTHER PUBLICATIONS

Extended European Search Report completed Jul. 27, 2023 for European Patent Application No. 23157971.5.

*Primary Examiner* — Ghodrat Jamshidi
(74) *Attorney, Agent, or Firm* — ALG Intellectual Property, LLC

(57) ABSTRACT

A method for issuance of a personalized user device includes initializing a user device to provide an initialized user device, providing device initialization data to an issuer system, wherein the device initialization data comprises a public device key and a public issuer authentication key, calculating a user private key, encrypting the user private key and the public device authentication key with the public device key to provide encrypted data, digitally signing the encrypted data using a private issuer key to provide signed encrypted data, the issuer system providing the encrypted data and the signed encrypted data, injecting said data into the initialized user device to provide the personalized user device, and the personalized user device, conditional on successfully validating the signed encrypted data, decrypting the encrypted data to retrieve the user private key and the public device authentication key.

15 Claims, 5 Drawing Sheets

(56) References Cited

U.S. PATENT DOCUMENTS

| | | | |
|---|---|---|---|
| 2011/0219232 A1* | 9/2011 | Yamaguchi | G06F 12/1408 |
| | | | 380/279 |
| 2011/0271344 A1* | 11/2011 | Unagami | G06F 21/554 |
| | | | 726/23 |
| 2017/0310647 A1* | 10/2017 | Hu | G06F 21/33 |
| 2018/0034625 A1* | 2/2018 | Hunacek | H04L 9/003 |
| 2018/0091509 A1* | 3/2018 | Lu | H04L 9/3268 |
| 2018/0330386 A1* | 11/2018 | Kim | H04L 63/0823 |
| 2020/0267006 A1* | 8/2020 | Nyman | H04L 63/062 |
| 2021/0021432 A1* | 1/2021 | Atkins | H04L 9/50 |
| 2022/0131838 A1* | 4/2022 | Mandich | H04L 63/045 |
| 2022/0255759 A1* | 8/2022 | Hurtado Tamayo | |
| | | | H04L 9/3271 |
| 2023/0246850 A1* | 8/2023 | Everspaugh | H04L 9/50 |
| | | | 713/180 |

* cited by examiner

METHOD FOR ISSUANCE OF A PERSONALIZED USER DEVICE

RELATED APPLICATIONS

The present application claims priority to EP Patent Application No. 23157971.5, filed Feb. 22, 2023, the contents of which are hereby incorporated by reference in their entirety.

BACKGROUND INFORMATION

The present invention generally relates to a method for issuance of a personalized user device, particularly issuance of a user device comprising a secret associated with a specific user. More particularly, the personalized user device may be a personalized smart card.

Digital cryptography and particularly respective cryptographic keys have become increasingly important in a digitalized world. Generally, so called secrets, such as cryptographic keys (in the following also simply referred to as "keys"), may be utilized for safe communication through respective encryption schemes and for example for providing digital signatures. Digital signatures may for example be used to sign contracts, provide a respective authorization or to transfer crypto assets.

However, the reliability of such methods is based on the respective secrets not being accessible to third parties, particularly a private key may typically be associated to a single entity/user (e.g., an individual or company). Thus, users are typically required to safely store their secret(s), e.g., private key(s), and to prevent unauthorized access thereto. One particularly safe way of storing such sensitive data is the use of a dedicated user device, e.g., a smart card or USB stick, which may comprise a secure portion (also referred to as secure enclave) in which respective secrets may be stored.

Oftentimes the respective personalized user device may further be related to a specific issuer, e.g., a financial institution that may issue the user device to the user. This may allow a user to communicate, authorize, and exchange and verify digital signatures with the respective issuer. However, the user device itself is typically provided by a third party, e.g., a provider. Thus, a method for issuance of the personalized user device to the user is needed, wherein the user device may be personalized to the user and assigned to the issuing institution without allowing the sensitive information, e.g., user data and particularly secrets such as private cryptographic keys, to be accessible to third parties. Specifically, it is desirable to prevent any party from gaining complete knowledge of all data stored on the user device during provision of the user device to a respective user.

In light of the above, it is an object of the present invention to provide a method for issuance of a personalized user device.

BRIEF DESCRIPTION OF THE DRAWINGS

Embodiments of the present invention will now be described with reference to the accompanying drawings. These embodiments should only exemplify, but not limit, the present invention.

DETAILED DESCRIPTION

Figure 1:
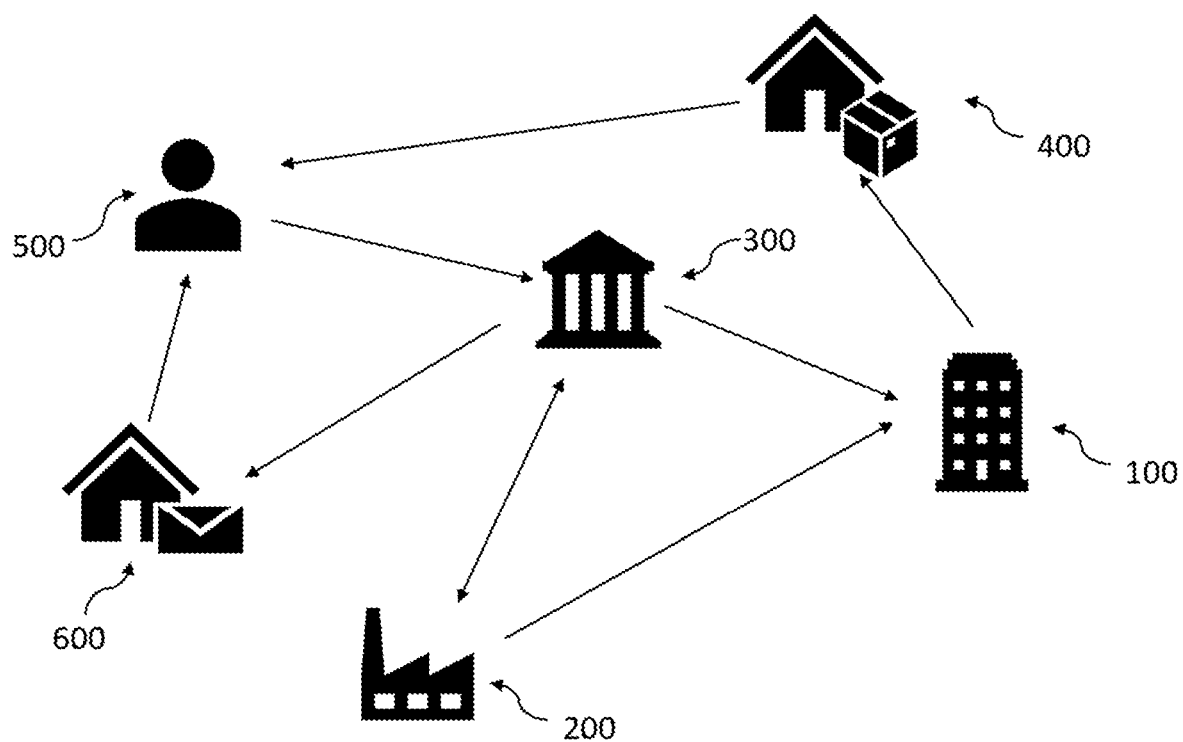
FIG. 1 depicts parties that may be involved in the issuance process.

These objects are met by the present invention.

In a first aspect, the present invention relates to a method for issuance of a personalized user device, wherein the method comprises initializing a user device to provide an initialized user device and wherein initializing comprises generating a device key pair comprising a public device key and a private device key and storing the private device key in the user device, generating an issuer authentication key pair comprising a public issuer authentication key and a private issuer authentication key and storing the private issuer authentication key in the user device, generating a serial number and storing the serial number in the user device, and injecting a public issuer key into the user device. Furthermore, the method comprises providing device initialization data to an issuer system, wherein the device initialization data comprises the public device key and the public issuer authentication key, the issuer system generating a device authentication key pair comprising a public device authentication key and a private device authentication key, calculating a user private key, encrypting the user private key and the public device authentication key with the public device key to provide encrypted data, digitally signing the encrypted data using a private issuer key associated with the public issuer key to provide signed encrypted data, the issuer system providing personalization device data, wherein the personalization device data comprises the encrypted data and the signed encrypted data, injecting the encrypted data and the signed encrypted data into the initialized user device to provide the personalized user device, and the personalized user device validating the signed encrypted data using the public issuer key and when successful decrypting the encrypted data to retrieve the user private key and the public device authentication key.

Thus, this method may advantageously allow to provide, or respectively issue a user device comprising all data without any party involved in the issuance process ever gaining full information on all the data of the personalized user device. In particular, the user private key may be generated by the issuer and transferred to the user device in an encrypted form, such that no third party can access said user private key as it can only be decrypted by the user device having access to the private device key. Furthermore, by also digitally signing the encrypted data, authenticity of the issuer can be verified prior to decrypting the encrypted data such that decryption of fraudulent data may be prevented.

Further, the method may comprise the issuer system calculating the user private key, the issuer system encrypting the user private key and the public device authentication key with the public device key to provide encrypted data, and the issuer system digitally signing the encrypted data using a private issuer key associated with the public issuer key to provide signed encrypted data. In other words, the steps of calculating the user private key, encrypting the user private key and the public device authentication key with the public device key to provide encrypted data, and digitally signing the encrypted data using a private issuer key associated with the public issuer key to provide signed encrypted data may be performed by the issuer system.

Alternatively, the method may comprise the issuer system providing the public device key, and the public device authentication key to an issuer hardware security module, the issuer hardware security module calculating the user private key, the issuer hardware security module encrypting the user private key and the public device authentication key with the public device key to provide encrypted data, and the issuer hardware security module digitally signing the encrypted data using a private issuer key associated with the public issuer key to provide signed encrypted data. That is, the method may comprise utilizing the issuer hardware security module and the steps of calculating the user private key, encrypting the user private key and the public device authentication key with the public device key to provide encrypted data, and digitally signing the encrypted data using a private issuer key associated with the public issuer key to provide signed encrypted data may be performed by the issuer hardware security module. Utilizing the issuer hardware security module may increase the overall security of the method and may thus be preferred.

The method may comprise providing the initialized user device to a user system, the user system extracting at least the public device key and the public issuer authentication key from the initialized user device, the user authenticating with the issuer system, preferably using the user system, the user system providing the device initialization data to the issuer system, the issuer system providing personalization device data to the user system, and the user system injecting the encrypted data and the signed encrypted data into the initialized user device to provide the personalized user device. That is, the user system may perform the steps of providing the device initialization data to the issuer system and injecting the encrypted data and the signed encrypted data into the initialized user device to provide the personalized user device. Furthermore, the issuer system may provide the personalization data to the user system. The user system may comprise at least one user end device, e.g., a laptop, smartphone, or other kind of processing device. The initialized user device may be provided to the user system by a provider system, the issuer, e.g., the issuer system, or a third party.

Alternatively, the method may comprise a provider system providing the initialized user device to a personalization system, the provider system providing the device initialization data to the issuer system, wherein the device initialization data further comprises the serial number, the issuer system providing personalization device data to the personalization system, wherein the personalization device data further comprises the serial number, and the personalization system injecting the encrypted data and the signed encrypted data into the initialized user device to provide the personalized user device. Thus, the user may only receive the user device once successfully personalized. In such an embodiment, the provider system may perform the step of providing the device initialization data to the issuer system. Furthermore, the issuer system may provide the personalization device data to the personalization system, and the personalization system, which receives the initialized user device from the provider system, may perform the step of injecting the encrypted data and the signed encrypted data into the initialized user device to provide the personalized user device.

It will be understood that the provider system providing the initialized user device to a personalization system also encompasses the possibility that the provider system prompts the initialized user device to be provided, e.g., sent, to the personalization system.

It will be understood that the personalization system may also be associated to the issuer, e.g., run by the issuer. However, preferably the personalization system may be independent from the issuer.

The device key pair may be generated by the user device. This may advantageously ensure that no other party gets access to the private device key as it is generated and stored in the user device and may thus never be accessible outside of the user device. This may thus prevent any other party from being able to decrypt data encrypted with the public device key. Similarly, the issuer authentication key pair may be generated by the user device. Again, this may advantageously ensure that no other party gets access to the private issuer authentication key as it is generated and stored in the user device and may thus never be accessible outside of the user device. Thus, this may prevent anyone from using the private issuer authentication key to pretend to be the user device. In other words, this ensures security of the authentication of the user device with respect to the issuer.

The issuer system may be in possession of user data.

The method may further comprise the personalization system generating a PIN and a PUK and the personalization system injecting the PIN and the PUK into the initialized user device or the personalized user device. PIN and PUK may generally allow the user to authenticate with the user device, e.g. through a 2-factor authentication process, and thus prevent any third party from unauthorised access to the user device. Further, the method may comprise the personalization system injecting the PIN, the PUK, the encrypted data and the signed encrypted data into the initialized user device to provide the personalized user device. That is, PIN and PUK may be injected together with the encrypted data and the signed encrypted data.

Alternatively to the personalization system generating PIN and PUK, the method may comprise generating the PIN and the PUK, and wherein the step of encrypting the user private key and the public device authentication key with the public device key to provide encrypted data comprises encrypting the user private key, the public device authentication key, the PIN and the PUK with the public device key to provide the encrypted data. This may advantageously allow to prevent the personalization system (or any malicious third party with access thereto) to gain knowledge of the PIN and PUK as they are only provided within the encrypted data that can only be decrypted by the user device holding the respective private device key. Thus, an additional layer of security may be established through such an embodiment.

Further, the method may comprise encrypting the PIN and the PUK with a public mailing key of a mailing system to provide encrypted personal data. In particular, the method may comprise the issuer hardware security module generating the PIN and the PUK, and wherein the step of the issuer hardware security module encrypting the user private key and the public device authentication key with the public device key to provide encrypted data comprises encrypting the user private key, the public device authentication key, the PIN and the PUK with the public device key to provide the encrypted data. That is, the step of generating PIN and PUK may be performed by the issuer hardware security module, which may also perform the step of encrypting the user private key, the public device authentication key, the PIN and the PUK with the public device key to provide the encrypted data. Further, the method may comprise the issuer hardware security module encrypting the PIN and the PUK with the public mailing key of the mailing system to provide encrypted personal data. That is, the step of encrypting PIN and PUK with the mailing key may be performed by the issuer hardware security module.

Alternatively, the method may comprise the issuer system generating the PIN and the PUK, and wherein the step of the issuer system encrypting the user private key and the public device authentication key with the public device key to provide encrypted data comprises encrypting the user private key, the public device authentication key, the PIN and the PUK with the public device key to provide the encrypted data. That is, the step of generating PIN and PUK may be performed by the issuer system, which may also perform the step of encrypting the user private key, the public device authentication key, the PIN and the PUK with the public device key to provide the encrypted data. Further, the method may comprise the issuer system encrypting the PIN and the PUK with a public mailing key of a mailing system to provide encrypted personal data.

The method may comprise providing the encrypted personal data to the mailing system. This may advantageously allow to securely provide PIN and PUK to a mailing system, which may be responsible for providing PIN and PUK to the user. Providing the encrypted personal data to the mailing system may the issuer system providing the encrypted personal data to the mailing system. In embodiments, wherein the issuer hardware security module encrypts PIN and the PUK to provide encrypted personal data, providing the encrypted personal data to the mailing system may further comprise the issuer hardware security module providing the encrypted personal data to the issuer system.

The method may further comprise the mailing system decrypting the encrypted personal data using a private mailing key associated with the public mailing key and providing PIN and PUK to a user. By providing PIN and PUK through the mailing system they may advantageously be provided to the user separate to the user device further increasing security of the process.

Providing the encrypted personal data to the mailing system may further comprise providing at least part of the user data to the mailing system, wherein the at least part of the user data is indicative of name and address of the respective user. In some embodiments, the encrypted personal data may further comprise at least part of the user data indicative of name and address of the respective user.

The user device may be a smart card. A smart card may typically be credit card sized and may comprise an integrated circuit chip. The smart card may for example be capable of contactless communication and/or wired communication through a respective card reader. Alternatively the user device may for example be a USB stick.

The method may further comprise the issuer hardware security module generating an issuer key pair comprising the public issuer key and the private issuer key and providing the public issuer key to the provider system. This may for example allow the issuer to authenticate itself by means of a digital signature using the private issuer key which can be verified using the public issuer key. Alternatively, the method may further comprise the issuer system generating an issuer key pair comprising the public issuer key and the private issuer key and providing the public issuer key to the provider system. The issuer key pair may be an elliptic curve key pair. The step of injecting the public issuer key into the user device may be performed by the provider system.

The serial number may be generated and subsequently injected into the user device by the provider system. In other words, the provider system may generate the serial number for the user device and subsequently inject said serial number into the user device. Alternatively, the serial number is generated by the user device. The user device may for example randomly generate the serial number. Generally the serial number may be a numeric or alphanumeric code.

The device key pair may be an RSA key pair. That is, the device key pair may allow for RSA encryption and thus enable holders of the public device key to encrypt data using RSA encryption such that only the user device, which is in possession of the respective private device key, can decrypt the encrypted data.

The issuer authentication key pair may be an elliptic curve key pair. Generally, the issuer authentication key pair may particularly be suited for digital signatures and corresponding verification thereof.

The user device may comprise a true random number generator and wherein the device key pair and/or the issuer authentication key pair are generated using the true random number generator. This may advantageously allow the user device to generate random and thus unknown and unpredictable keys.

The method may further comprise the issuer system storing at least part of the device initialization data. In particular, the issuer system may store the public issuer authentication key, and optionally the public device key and/or the serial number.

The device authentication key pair is an elliptic curve key pair. Generally, the device authentication key pair may particularly be suited for digital signatures and corresponding verification thereof. The method may further comprise the issuer system storing the private device authentication key. The private device authentication key may allow the issuer system to authenticate itself with the user device through a digital signature using the private device authentication key which may be verified, e.g., by the user device, using the public device authentication key. The issuer system may comprise an issuer system hardware security module and wherein the device authentication key pair may be generated in the issuer system hardware security module. It will be understood that the issuer system hardware security module may generally be different to the issuer hardware security module. However, in certain embodiments, the issuer system hardware security module and the issuer hardware security module may be realized in a single hardware security module. The method may further comprise the issuer system storing the private device authentication key in the issuer system hardware security module.

The user private key may be calculated based on a derivation element. Further, the issuer system may comprise a seed and wherein the user private key is calculated based on the derivation element and the seed using a key derivation function. Alternatively, the method may further comprise the issuer system providing the derivation element to the issuer hardware security module. The issuer hardware security module may comprise a seed and the user private key may be calculated based on the derivation element and the seed using a key derivation function. The seed may also be referred to as seed key or master key and the key derivation function may generally be a cryptographic algorithm that is designed to derive keys from the seed based on the derivation element. The derivation element may be a derivation number, e.g., an index. Alternatively, the derivation element may be a derivation path. Generally, the derivation element may be user-specific. That is, each user may be associated with a different derivation element. In some cases, a user may also be associated with more than one derivation element. However, two unrelated users may not be associated with the same derivation element.

The issuer system hardware security module and the issuer hardware security module may be provided by a single hardware security module. Alternatively and preferably, the issuer system hardware security module and the issuer hardware security module may be separate modules. This may allow to increase the overall security as there may be no direct communication between the issuer system hardware security module and the issuer hardware security module. In some embodiments, the issuer hardware security module is comprised by the issuer system. In other words, the issuer hardware security module may for example be provided through hardware (and software) that is comprised by the issuer system, e.g. through a PCIe-module. Alternatively, the issuer hardware security module may for example be an external hardware security module that is connected to the issuer system in order to allow communication therebetween. An external hardware security module may be provided through an external computing device comprising the issuer hardware security module. An external hardware security module may for example be a network hardware security module.

The user private key may be an elliptic curve key. Generally, the user private key may be configured for digitally signing data, e.g. transaction data. For example, the user private key may be a blockchain key.

The method may further comprise providing the personalized user device to a user. Providing the personalized user device to the user may comprise may comprise the personalization system providing the personalized user device to a shipping system and the shipping system shipping the user device to the user. In some embodiments, the shipping system may further provide the PIN and the PUK to the user separate to the user device. Providing PIN and PUK separate to the user device, i.e., in a separate shipping, may increase security as it reduces the risk of a malicious third party gaining access to both, user device, and PIN and PUK.

The method may comprise the issuer system generating device data comprising the public device key, and the public device authentication key. Additionally or alternatively, the issuer system providing the public device key, and the public device authentication key to the issuer hardware security module may comprise the issuer system providing device data to the issuer hardware security module, the device data comprising the public device key, and the public device authentication key. The device data may further comprise the device initialization data and user data. The device data may further comprise the derivation element.

The personalization device data may comprise the device initialization data. Additionally or alternatively, the personalization device data may comprise the user data. The user data may comprise the user name and the user address.

The method may further comprise the personalization system indicating name and/or serial number on the user device. In particular, the method may comprise the personalization system printing name and/or serial number on the user device. This may allow to uniquely identify the user device among other user devices.

The method may comprise initializing a plurality of user devices, wherein a different device key pair, a different issuer authentication key pair and a different serial number is generated for each of the plurality of user devices. That is, the method may generally comprise batch-processing of user devices, e.g., in packs of N. Furthermore, the method may comprise the provider system providing the plurality of initialized user device to the personalization system. The device initialization data may comprise the public device key and the public issuer authentication key and optionally the serial number for each of the plurality of user devices. Further, the method may comprise the issuer system generating a different device authentication key pair for each of the plurality of user devices.

The issuer system may provide the public device key, and the public device authentication key and optionally a respective derivation element to the issuer hardware security module for each of the plurality of user devices. Again, the public device key and the public device authentication key may typically be device-specific, i.e., different for each user device and the derivation element may be at least user-specific, i.e., different for each user, optionally also device-specific. The device data may comprise the device initialization data, user data, and the public device authentication key and optionally a different derivation element for each of the plurality of user devices.

The method may comprise calculating a user private key for each of the plurality of user devices. In other words, for each derivation element, a respective user private key may be calculated, wherein user private keys based on different derivation elements may be different to one another.

The user private key, the public device authentication key and optionally the PIN and the PUK, may be encrypted separately for each of the plurality of user devices. Further, the encrypted data may be digitally signed separately for each of the plurality of user devices.

The personalization device data may comprise the encrypted data and the signed encrypted data and optionally the serial number for each of the plurality of user devices. Further, the personalization device data may comprise the user data for each of the plurality of user devices. Each of the encrypted data may be injected into the respective user device identified through the corresponding serial number.

The method may further comprise the issuer hardware security module providing the encrypted data and the signed encrypted data to the issuer system.

Providing initialization data to the issuer system may comprise encrypting the initialization data and providing the encrypted initialization data to the issuer system and the issuer system decrypting the encrypted initialization data to retrieve the initialization data. This may advantageously increase security during provision, e.g., transmission, of the initialization data and prevent unauthorised access. Such encryption and decryption may for example be realized through an RSA key pair, an elliptic curve key pair or symmetric keys.

Similarly, the issuer system providing device data to the issuer hardware security module may comprise the issuer system encrypting the device data and providing the encrypted device data to the issuer hardware security module and the issuer hardware security module decrypting the encrypted device data to retrieve the device data. Again, this may advantageously increase security during provision, e.g., transmission, of the device data and prevent unauthorised access. Such encryption and decryption may for example be realized through an RSA key pair, an elliptic curve key pair or symmetric keys.

The issuer system providing personalization device data to the personalization system may comprise the issuer system encrypting the personalization device data and providing the encrypted personalization device data to the personalization system and the personalization system decrypting the encrypted personalization device data to retrieve the personalization device data. Again, this may advantageously increase security during provision, e.g., transmission, of the personalization device data and prevent unauthorised access. Such encryption and decryption may for example be realized through an RSA key pair, an elliptic curve key pair or symmetric keys.

The issuer system providing personalization device data to the user system may comprise the issuer system encrypting the personalization device data and providing the encrypted personalization device data to the user system and the user system decrypting the encrypted personalization device data to retrieve the personalization device data.

Initializing may further comprise storing the public device key in the user device. Similarly, initializing may comprise storing the public issuer authentication key in the user device.

Furthermore, initializing may comprise the user device providing the public issuer authentication key to the provider system, the provider system digitally signing the public issuer authentication key with a private root key to provide a root-signed issuer authentication key, the provider providing the root-signed issuer authentication key to the user device, and the user device storing the root-signed issuer authentication key. This may advantageously allow third parties to verify that the user device and particularly the data thereon, more particularly the issuer authentication key pair are indeed provided through the provider system. That is, the provider system assures that the issuer authentication key pair is validly generated by the user device under supervision of the provider system and not by any malicious third party. The method may further comprise the provider system providing the root-signed issuer authentication key to the issuer system or, alternatively, the user system providing the root-signed issuer authentication key to the issuer system. This may advantageously allow the issuer to also check the authenticity/genuineness of the provided data and particularly the public issuer authentication key. In such embodiments, the initialization data may further comprise the root-signed issuer authentication key.

The method may further comprise the user device digitally signing the public device key with the private issuer authentication key to provide a signed device key, and storing the signed device key. This may allow to also check authenticity of the device key through a chain of authenticity since authenticity of the issuer authentication key may be verified through the root-signed issuer authentication key. Furthermore, the method may comprise the provider system providing the signed device key to the issuer system or, alternatively, the user system providing the signed device key to the issuer system. Again, this may also the issuer to also check the authenticity/genuineness of the provided data and particularly the public device key. In such embodiments, the initialization data may further comprise the signed device key.

Initializing may further comprise the user device providing the public device key to the provider system, the provider system digitally signing the public device key with the private root key to provide a root-signed device key, the provider providing the root-signed device key to the user device, and the user device storing the root-signed device key. Again, this may advantageously allow third parties to verify that the user device and particularly the data thereon, more particularly the device key pair are indeed provided through the provider system. That is, the provider system assures that the device key pair is validly generated by the user device under supervision of the provider system and not by any malicious third party. The method may further comprise the provider system providing the root-signed device key to the issuer system or, alternatively the user system providing the root-signed device key to the issuer system. Again, this may also the issuer to also check the authenticity/genuineness of the provided data and particularly the public device key. In such embodiments, the initialization data may further comprise the root-signed device key.

The method may further comprise the personalization system providing a public root key to the issuer system, wherein the public root key is associated with the private root key. It will be understood that the public root key being associated with the private root key and more generally a public key being associated to a private key, refers to these keys forming a respective key pair.

The method may further comprise the issuer system digitally signing data prior to providing it to the issuer hardware security module and the issuer hardware security module verifying the digital signature. That is, the issuer system may digitally sign data with a respective private key prior to providing it to the issuer HSM, which may advantageously allow the issuer HSM to verify that the data has not (internally) been tempered with, e.g., during transmission between the issuer system and the issuer HSM. Such a verification would be based on verifying the digital signature based on a respective public key. This may advantageously allow to increase the overall security of the process.

In particular, the method may further comprise the issuer system digitally signing the public device key, the public device authentication key and optionally the derivation element prior to providing them to the issuer hardware security module and the issuer hardware security module verifying the digital signature. In other words, the issuer system may digitally sign the public device key, the public device authentication key and a derivation element either separately or together with a respective private key prior to providing it to the issuer HSM, which may advantageously allow the issuer HSM to verify that these have not (internally) been tempered with, e.g., during transmission between the issuer system and the issuer HSM. Such a verification would be based on verifying the digital signature based on a respective public key. This may advantageously allow to increase the overall security of the process.

In another aspect, the present invention is directed at a personalized user device comprising a private device key, a private issuer authentication key, a public issuer key, a serial number, a user private key, a public device authentication key, a PIN, and a PUK. The private device key may be an RSA key. The private issuer authentication key may be an elliptic curve key. The private issuer authentication key may be configured to enable authentication of the user device through a digital signature. The user private key may be an elliptic curve key. The user private key may be configured to digitally sign data elements, preferably data elements relating to transactions in a blockchain. The public device authentication key may be an elliptic curve key. The public device authentication key may be configured to validate a digital signature provided by an owner of the corresponding private device authentication key. The public issuer key may be an elliptic curve key. The public issuer key may be configured to validate a digital signature provided by an owner of the corresponding private issuer key. The device may be a smart card.

Further, the device may comprise a public device key associated with the private device key. The device may comprise a public issuer authentication key associated with the private issuer authentication key. The device may further comprise a root-signed device key, corresponding to a digital signature of the public device key with a respective private root key owned by a provider of the user device. The device may further comprise a root-signed issuer authentication key, corresponding to a digital signature of the public issuer authentication key with the respective private root key owned by the provider of the user device. The device may further comprise a signed device key, corresponding to a digital signature of the public device key with the private issuer authentication key. The device may be issued using the method according to any of the preceding method embodiments.

In yet another aspect, the present invention relates to a system comprising a personalized user device as described above, and an issuer comprising an issuer system and an issuer HSM, wherein the issuer HSM comprises a private issuer key, and wherein the issuer HSM and/or the issuer system comprises a private issuer key, a public device key, a public issuer authentication key, a private device authentication key, and a user private key.

The private issuer key may be stored in the issuer hardware security module. The private issuer key may be associated with the public issuer key comprised by the personalized user device. The user private key may be stored in the issuer hardware security module. The private device authentication key may be stored in the issuer hardware security module or an issuer system hardware security module comprised by the issuer system. The private device authentication key may be associated with the public device authentication key comprised by the personalized user device. The private device authentication key may be configured to enable authentication of the issuer system and/or issuer HSM through a digital signature. The private issuer key may be configured to enable authentication of the issuer system and/or issuer HSM through a digital signature.

Below, reference will be made to method embodiments. These embodiments are abbreviated by the letter "M" followed by a number. Whenever reference is herein made to "method embodiments", these embodiments are meant.

M1. A method for issuance of a personalized user device (60), wherein the method comprises
- initializing a user device (2) to provide an initialized user device (4), wherein initializing comprises
  - generating a device key pair comprising a public device key (6) and a private device key (8) and storing the private device key (8) in the user device (2);
  - generating an issuer authentication key pair comprising a public issuer authentication key (10) and a private issuer authentication key (12) and storing the private issuer authentication key in the user device (2);
  - generating a serial number and storing the serial number in the user device (2); and
  - injecting a public issuer key (14) into the user device (2);
- providing device initialization data (20) to an issuer system (310), wherein the device initialization data (20) comprises the public device key (6) and the public issuer authentication key (12);
  - the issuer system (310) generating a device authentication key pair comprising a public device authentication key (32) and a private device authentication key (34);
  - calculating a user private key (42);
  - encrypting the user private key (42) and the public device authentication key (32) with the public device key (6) to provide encrypted data (52);
  - digitally signing the encrypted data (52) using a private issuer key (16) associated with the public issuer key (14) to provide signed encrypted data (54);
- the issuer system (310) providing personalization device data (24), wherein the personalization device data (24) comprises the encrypted data (52) and the signed encrypted data (54);
- injecting the encrypted data (52) and the signed encrypted data (54) into the initialized user device (4) to provide the personalized user device (60); and
- the personalized user device (60) validating the signed encrypted data (54) using the public issuer key (14) and when successful decrypting the encrypted data (52) to retrieve the user private key (42) and the public device authentication key (32).

M2. The method according to the preceding method embodiment, wherein the method comprises
- the issuer system (310) calculating the user private key (42);
- the issuer system (310) encrypting the user private key (42) and the public device authentication key (32) with the public device key (6) to provide encrypted data (52); and
- the issuer system (310) digitally signing the encrypted data (52) using a private issuer key (16) associated with the public issuer key (14) to provide signed encrypted data (54).

M3. The method according to the penultimate method embodiment, wherein the method comprises
- the issuer system (310) providing the public device key (6), and the public device authentication key (32) to an issuer hardware security module (350);
- the issuer hardware security module (350) calculating the user private key (42);
- the issuer hardware security module (350) encrypting the user private key (42) and the public device authentication key (32) with the public device key (6) to provide encrypted data (52); and
- the issuer hardware security module (350) digitally signing the encrypted data (52) using a private issuer key (16) associated with the public issuer key (14) to provide signed encrypted data (54).

M4. The method according to any of the preceding method embodiments, wherein the method comprises
- providing the initialized user device (4) to a user system;
- the user system extracting at least the public device key (6) and the public issuer authentication key (12) from the initialized user device (4);
- the user (500) authenticating with the issuer system (310), preferably using the user system;
- the user system providing the device initialization data (20) to the issuer system (310);
- the issuer system (310) providing personalization device data (24) to the user system; and
- the user system injecting the encrypted data (52) and the signed encrypted data (54) into the initialized user device (4) to provide the personalized user device (60).

M5. The method according to any of the preceding method embodiments M1 to M3, wherein the method comprises
- a provider system (200) providing the initialized user device (4) to a personalization system (100);
- the provider system (200) providing the device initialization data (20) to the issuer system (310), wherein the device initialization data (20) further comprises the serial number;
- the issuer system (310) providing personalization device data (24) to the personalization system (100), wherein the personalization device data (24) further comprises the serial number; and the personalization system (100) injecting the encrypted data (52) and the signed encrypted data (54) into the initialized user device (4) to provide the personalized user device (60).

It will be understood that the provider system providing the initialized user device to a personalization system also encompasses the possibility that the provider system prompts the initialized user device to be provided, e.g., sent, to the personalization system.

M6. The method according to any of the preceding method embodiments, wherein the device key pair is generated by the user device.

M7. The method according to any of the preceding method embodiments, wherein the issuer authentication key pair is generated by the user device.

M8. The method according to any of the preceding method embodiments, wherein the issuer system is in possession of user data (36).

M9. The method according to any of the preceding method embodiments with the features of M5, wherein the method further comprises
the personalization system (100) generating a PIN (46) and a PUK (48); and
the personalization system (100) injecting the PIN (46) and the PUK (48) into the initialized user device (4) or the personalized user device (60).

M10. The method according to the preceding method embodiment, wherein the method comprises the personalization system (100) injecting the PIN (46), the PUK (48), the encrypted data (52) and the signed encrypted data (54) into the initialized user device (4) to provide the personalized user device (60).

M11. The method according to any of method embodiments M1 to M8, wherein the method further comprises
generating the PIN (46) and the PUK (48); and
wherein the step of encrypting the user private key (42) and the public device authentication key (32) with the public device key (6) to provide encrypted data (52) comprises encrypting the user private key (42), the public device authentication key (32), the PIN (46) and the PUK (48) with the public device key (6) to provide the encrypted data (52).

M12. The method according to the preceding method embodiment, wherein the method further comprises encrypting the PIN (46) and the PUK (48) with a public mailing key (72) of a mailing system (600) to provide encrypted personal data (49).

M13. The method according to any of method embodiments M3 to M8 with the features of M3, wherein the method further comprises
the issuer hardware security module (350) generating the PIN (46) and the PUK (48); and
wherein the step of the issuer hardware security module (350) encrypting the user private key (42) and the public device authentication key (32) with the public device key (6) to provide encrypted data (52) comprises encrypting the user private key (42), the public device authentication key (32), the PIN (46) and the PUK (48) with the public device key (6) to provide the encrypted data (52).

M14. The method according to the preceding method embodiment, wherein the method further comprises the issuer hardware security module (350) encrypting the PIN (46) and the PUK (48) with a public mailing key (72) of a mailing system (600) to provide encrypted personal data (49).

M15. The method according to any of method embodiments M2 to M8 with the features of M2, wherein the method further comprises
the issuer system (310) generating the PIN (46) and the PUK (48); and
wherein the step of the issuer system (310) encrypting the user private key (42) and the public device authentication key (32) with the public device key (6) to provide encrypted data (52) comprises encrypting the user private key (42), the public device authentication key (32), the PIN (46) and the PUK (48) with the public device key (6) to provide the encrypted data (52).

M16. The method according to the preceding method embodiment, wherein the method further comprises the issuer system (310) encrypting the PIN (46) and the PUK (48) with a public mailing key (72) of a mailing system (600) to provide encrypted personal data (49).

M17. The method according any of method embodiments M12, M14 and M16, wherein the method further comprises providing the encrypted personal data (49) to the mailing system (600).

M18. The method according to the preceding method embodiment, wherein providing the encrypted personal data (49) to the mailing system (600) comprises the issuer system (310) providing the encrypted personal data (49) to the mailing system (600).

M19. The method according to the preceding method embodiment with the features of M14, wherein providing the encrypted personal data (49) to the mailing system (600) further comprises the issuer hardware security module (350) providing the encrypted personal data (49) to the issuer system (310).

M20. The method according to any of the 3 preceding method embodiments, wherein the method further comprises the mailing system (600) decrypting the encrypted personal data (49) using a private mailing key associated with the public mailing key (72) and providing PIN (46) and PUK (46) to a user (500).

M21. The method according to any of the 4 preceding method embodiments and with the features of M8, wherein providing the encrypted personal data (49) to the mailing system (600) further comprises providing at least part of the user data (36) to the mailing system (600), wherein the at least part of the user data (36) is indicative of name and address of the respective user (500).

M22. The method according to any of the 5 preceding method embodiments and with the features of M8 and M12, M14 or M16, wherein the encrypted personal data (49) further comprises at least part of the user data (36) indicative of name and address of the respective user (500).

M23. The method according to any of the preceding method embodiments, wherein the user device is a smart card.

M24. The method according to any of the preceding method embodiments with the features of M3, wherein the method further comprises
the issuer hardware security module generating an issuer key pair comprising the public issuer key and the private issuer key; and
providing the public issuer key to the provider system.

M25. The method according to any of the preceding method embodiments with the features of M2, wherein the method further comprises
the issuer system generating an issuer key pair comprising the public issuer key and the private issuer key; and
providing the public issuer key to the provider system.

M26. The method according to any of the 2 the preceding method embodiment, wherein the issuer key pair is an elliptic curve key pair.

M27. The method according to any of the preceding method embodiments, wherein the serial number is generated and subsequently injected into the user device by the provider system.

M28. The method according to any of the preceding method embodiments but excluding the features of M27, wherein the serial number is generated by the user device.

M29. The method according to any of the preceding method embodiments, wherein the step of injecting the public issuer key into the user device is performed by the provider system.

M30. The method according to any of the preceding method embodiments, wherein the device key pair is an RSA key pair.

M31. The method according to any of the preceding method embodiments, wherein the issuer authentication key pair is an elliptic curve key pair.

M32. The method according to any of the preceding method embodiments, wherein the user device comprises a true random number generator and wherein the device key pair and/or the issuer authentication key pair are generated using the true random number generator.

M33. The method according to any of the preceding method embodiments, wherein the method further comprises the issuer system storing at least part of the device initialization data.

M34. The method according to the preceding method embodiment, wherein the issuer system stores the public issuer authentication key, and optionally the public device key and/or the serial number.

M35. The method according to any preceding method embodiments, wherein the device authentication key pair is an elliptic curve key pair.

M36. The method according to any of the preceding method embodiments, wherein the method further comprises the issuer system storing the private device authentication key.

M37. The method according to any preceding method embodiment, wherein the issuer system comprises an issuer system hardware security module and wherein the device authentication key pair is generated in the issuer system hardware security module.

M38. The method according to the preceding method embodiment, wherein the method further comprises the issuer system storing the private device authentication key in the issuer system hardware security module.

M39. The method according to any of the preceding method embodiments, wherein the user private key is calculated based on a derivation element.

M40. The method according to the preceding method embodiment, wherein the issuer system comprises a seed and wherein the user private key is calculated based on the derivation element and the seed using a key derivation function.

M41. The method according to the penultimate method embodiment with the features of M3, wherein the method further comprises the issuer system providing the derivation element to the issuer hardware security module.

M42. The method according to the preceding method embodiment, wherein the issuer hardware security module comprises a seed and wherein the user private key is calculated based on the derivation element and the seed using a key derivation function.

M43. The method according to any of the 4 preceding method embodiments, wherein the derivation element is a derivation number.

M44. The method according to any of the 5 preceding method embodiments, wherein the derivation element is a derivation path.

M45. The method according to any of the preceding method embodiments and with the features of M37, wherein the issuer system hardware security module and the issuer hardware security module are provided by a single hardware security module.

M46. The method according to any of the preceding method embodiments, without the features of the preceding embodiment and with the features of M37, wherein the issuer system hardware security module and the issuer hardware security module are separate modules.

M47. The method according to any of the preceding method embodiments with the features of M3, wherein the issuer hardware security module is comprised by the issuer system.

M48. The method according to any of the preceding method embodiments, wherein the user private key is an elliptic curve key.

M49. The method according to any of the preceding method embodiments without the features of M4, wherein the method further comprises providing the personalized user device to the user.

M50. The method according to the preceding method embodiment, wherein providing the personalized user device to the user comprises
the personalization system providing the personalized user device to a shipping system; and
the shipping system shipping the user device to the user.

M51. The method according to the preceding embodiment and with the features of M9, wherein the shipping system further provides the PIN and the PUK to the user separate to the user device.

M52. The method according to any of the preceding method embodiments, wherein the method comprises the issuer system generating device data comprising the public device key, and the public device authentication key.

M53. The method according to any of the preceding method embodiments with the features of M3, wherein the issuer system providing the public device key, and the public device authentication key to the issuer hardware security module comprises the issuer system providing device data to the issuer hardware security module, the device data comprising the public device key, and the public device authentication key.

M54. The method according to any of the 2 preceding method embodiment and with the features of M39, wherein the device data further comprises the derivation element.

M55. The method according to any of the 3 preceding method embodiments, wherein the device data further comprises the device initialization data and user data.

M56. The method according to any of the preceding method embodiments, wherein the personalization device data comprises the device initialization data.

M57. The method according to any of the preceding method embodiments and with the features of M8, wherein the personalization device data comprises the user data.

M58. The method according to any of the preceding method embodiments and with the features of M8, wherein the user data comprises the user name and the user address.

M59. The method according to any of the preceding method embodiments with the features of M5, wherein the method further comprises the personalization system indicating name and/or serial number on the user device.

M60. The method according to any of the preceding method embodiments with the features of M5, wherein the method further comprises the personalization system printing name and/or serial number on the user device.

M61. The method according to any of the preceding method embodiments, wherein the method comprises
initializing a plurality of user devices, wherein a different device key pair, a different issuer authentication key pair and a different serial number is generated for each of the plurality of user devices.

M62. The method according to the preceding method embodiment with the features of M5, wherein the method comprises the provider system providing the plurality of initialized user device to the personalization system.

M63. The method according to any of the 2 preceding method embodiments, wherein the device initialization data comprises, the public device key and the public issuer authentication key and optionally the serial number for each of the plurality of user devices.

M64. The method according to the preceding method embodiment, wherein the method comprises the issuer system generating a different device authentication key pair for each of the plurality of user devices.

M65. The method according to any of the 2 preceding method embodiments with the features of M3, wherein the issuer system provides the public device key, and the public device authentication key and optionally a respective derivation element to the issuer hardware security module for each of the plurality of user devices.

M66. The method according to any of the 2 preceding method embodiments and with the features of M8, and M52, M53 and/or M54, wherein the device data comprises the device initialization data, user data, the public device authentication key and optionally a respective derivation element for each of the plurality of user devices.

M67. The method according to any of the 2 preceding method embodiments, wherein the method comprises calculating a user private key for each of the plurality of user devices.

M68. The method according to the preceding method embodiment, wherein the user private key, the public device authentication key and optionally the PIN and the PUK, are encrypted separately for each of the plurality of user devices.

M69. The method according to the preceding method embodiment, wherein the encrypted data are digitally signed separately for each of the plurality of user devices.

M70. The method according to the preceding method embodiment, wherein the personalization device data comprises the encrypted data and the signed encrypted data, and optionally the serial number for each of the plurality of user devices.

M71. The method according to the preceding method embodiment, wherein the personalization device data comprises the user data for each of the plurality of user devices.

M72. The method according to any of the 2 preceding method embodiments, wherein each of the encrypted data is injected into the respective user device identified through the corresponding serial number.

M73. The method according to any of the preceding method embodiments with the features of M3, wherein the method further comprises the issuer hardware security module providing the encrypted data and the signed encrypted data to the issuer system.

M74. The method according to any of the preceding method embodiments, wherein providing initialization data to the issuer system comprises the encrypting the initialization data and providing the encrypted initialization data to the issuer system and the issuer system decrypting the encrypted initialization data to retrieve the initialization data.

M75. The method according to any of the preceding method embodiments and with the features of M53, wherein the issuer system providing device data to the issuer hardware security module comprises the issuer system encrypting the device data and providing the encrypted device data to the issuer hardware security module and the issuer hardware security module decrypting the encrypted device data to retrieve the device data.

M76. The method according to any of the preceding method embodiments with the features of M5, wherein the issuer system providing personalization device data to the personalization system comprises the issuer system encrypting the personalization device data and providing the encrypted personalization device data to the personalization system and the personalization system decrypting the encrypted personalization device data to retrieve the personalization device data.

M77. The method according to any of the preceding method embodiments with the features of M4, wherein the issuer system providing personalization device data to the user system comprises the issuer system encrypting the personalization device data and providing the encrypted personalization device data to the user system and the user system decrypting the encrypted personalization device data to retrieve the personalization device data.

M78. The method according to any of the preceding method embodiments, wherein initializing further comprises storing the public device key in the user device.

M79. The method according to any of the preceding method embodiments, wherein initializing further comprises storing the public issuer authentication key in the user device.

M80. The method according to any of the preceding method embodiments, wherein initializing further comprises
the user device providing the public issuer authentication key to the provider system;
the provider system digitally signing the public issuer authentication key with a private root key to provide a root-signed issuer authentication key;
the provider providing the root-signed issuer authentication key to the user device; and
the user device storing the root-signed issuer authentication key.

M81. The method according to the preceding method embodiment with the features of M5, wherein the method further comprises the provider system providing the root-signed issuer authentication key to the issuer system.

M82. The method according to the penultimate method embodiment with the features of M4, wherein the method further comprises the user system providing the root-signed issuer authentication key to the issuer system.

M83. The method according to any of the 3 preceding method embodiments, wherein the initialization data further comprises the root-signed issuer authentication key.

M84. The method according to any of the 3 preceding method embodiments, wherein the method further comprises the user device
digitally signing the public device key with the private issuer authentication key to provide a signed device key; and
storing the signed device key.

M85. The method according to the preceding method embodiment with the features of M5, wherein the method further comprises the provider system providing the signed device key to the issuer system.

M86. The method according to the penultimate method embodiment with the features of M4, wherein the method further comprises the user system providing the signed device key to the issuer system.

M87. The method according to any of the 3 preceding method embodiments, wherein the initialization data further comprises the signed device key.

M88. The method according to any of the preceding method embodiments, wherein initializing further comprises
the user device providing the public device key to the provider system;
the provider system digitally signing the public device key with the private root key to provide a root-signed device key;
the provider providing the root-signed device key to the user device; and
the user device storing the root-signed device key.

M89. The method according to the preceding method embodiment with the features of M5, wherein the method further comprises the provider system providing the root-signed device key to the issuer system.

M90. The method according to the preceding method embodiment with the features of M4, wherein the method further comprises the user system providing the root-signed device key to the issuer system.

M91. The method according to any of the 3 preceding method embodiments, wherein the initialization data further comprises the root-signed device key.

M92. The method according to any of the 12 preceding method embodiments, wherein the method further comprises the personalization system providing a public root key to the issuer system, wherein the public root key is associated with the private root key.

M93. The method according to any of the preceding method embodiments with the features of M3, wherein the method further comprises
the issuer system digitally signing data prior to providing it to the issuer hardware security module; and
the issuer hardware security module verifying the digital signature.

M94. The method according to any of the preceding method embodiments with the features of M3, wherein the method further comprises
the issuer system digitally signing the public device key, the public device authentication key and optionally the derivation element prior to providing them to the issuer hardware security module; and
the issuer hardware security module verifying the digital signature.

Below, reference will be made to user device embodiments. These embodiments are abbreviated by the letter "D" followed by a number. Whenever reference is herein made to "device embodiments", these embodiments are meant.

D1. Personalized user device, comprising
a private device key;
a private issuer authentication key;
a public issuer key;
a serial number;
a user private key;
a public device authentication key;
a PIN; and
a PUK.

D2. The device according to the preceding device embodiment, wherein the private device key is an RSA key.

D3. The device according to any of the preceding device embodiments, wherein the private issuer authentication key is an elliptic curve key.

D4. The device according to any of the preceding device embodiments, wherein the private issuer authentication key is configured to enable authentication of the user device through a digital signature.

D5. The device according to any of the preceding device embodiments, wherein the user private key is an elliptic curve key.

D6. The device according to any of the preceding device embodiments, wherein the user private key is configured to digitally sign data elements, preferably data elements relating to transactions in a blockchain.

D7. The device according to any of the preceding device embodiments, wherein the public device authentication key is an elliptic curve key.

D8. The device according to any of the preceding device embodiments, wherein the public device authentication key is configured to validate a digital signature provided by an owner of the corresponding private device authentication key.

D9. The device according to any of the preceding device embodiments, wherein the public issuer key is an elliptic curve key.

D10. The device according to any of the preceding device embodiments, wherein the public issuer key is configured to validate a digital signature provided by an owner of the corresponding private issuer key.

D11. The device according to any of the preceding device embodiments, wherein the device is a smart card.

D12. The device according to any of the preceding device embodiments, wherein the device further comprises a public device key associated with the private device key.

D13. The device according to any of the preceding device embodiments, wherein the device further comprises a public issuer authentication key associated with the private issuer authentication key.

D14. The device according to any of the preceding device embodiments, wherein the device further comprises a root-signed device key, corresponding to a digital signature of the public device key with a respective private root key owned by a provider of the user device.

D15. The device according to any of the preceding device embodiments, wherein the device further comprises a root-signed issuer authentication key, corresponding to a digital signature of the public issuer authentication key with the respective private root key owned by the provider of the user device.

D16. The device according to any of the preceding device embodiments, wherein the device further comprises a signed device key, corresponding to a digital signature of the public device key with the private issuer authentication key.

D17. The device according to any of the preceding device embodiments, wherein the device is issued using the method according to any of the preceding method embodiments.

Below, reference will be made to user system embodiments. These embodiments are abbreviated by the letter "S" followed by a number. Whenever reference is herein made to "system embodiments", these embodiments are meant.

S1. System comprising
a personalized user device according to any of the preceding device embodiments; and
an issuer comprising an issuer system and an issuer HSM;

wherein the issuer HSM comprises a private issuer key; and wherein the issuer HSM and/or the issuer system comprises
a private issuer key,
a public device key,
a public issuer authentication key,
a private device authentication key, and
a user private key.

S2. The system according to the preceding system embodiment, wherein the private issuer key is stored in the issuer hardware security module.

S3. The system according to any of the preceding system embodiments, wherein the private issuer key is associated with the public issuer key comprised by the personalized user device.

S4. The system according to any of the preceding system embodiments, wherein the user private key is stored in the issuer hardware security module.

S5. The system according to any of the preceding system embodiments, wherein the private device authentication key stored in the issuer hardware security module or an issuer system hardware security module comprised by the issuer system.

S6. The system according to any of the preceding system embodiments, wherein the private device authentication key is associated with the public device authentication key comprised by the personalized user device.

S7. The system according to any of the preceding system embodiments, wherein the private device authentication key is configured to enable authentication of the issuer system and/or issuer HSM through a digital signature.

S8. The system according to any of the preceding system embodiments, wherein the private issuer key is configured to enable authentication of the issuer system and/or issuer HSM through a digital signature.

It is noted that not all the drawings carry all the reference signs. Instead, in some of the drawings, some of the reference signs have been omitted for the sake of brevity and simplicity of the illustration. Embodiments of the present invention will now be described with reference to the accompanying drawings.

Reference will now be made to FIG. 1 depicting parties that may be involved in the issuance process of a personalized user device. In the following, the present invention is discussed with respect to issuance of a smart card as the user device. However, it will be understood that this is purely for illustrative reasons and that also other devices, e.g., a USB stick, may serve as a respective user device that is issued in accordance to the present invention.

Generally, a user 500 may request a smart card at an issuer 300, e.g., an institution such as a bank. The issuer 300 may be in possession of card initialization data relating to an initialized smart card provided by a provider system 200, alternatively the issuer 300 may request respective data from the provider system 200 once needed. Generally, the provider system 200 may initialize a blank smart card to provide an initialized smart card and subsequently provide corresponding card initialization data to the issuer 300, while the initialized smart card is provided to a personalization system 100. The issuer 300 may then provide personalization card data to the personalization system 100, which may subsequently inject data into the user device to provide the desired smart card. Subsequently, the smart card may be provided to the user, e.g., by means of a shipping system 400.

In some embodiments, a personal identification number (PIN) and personal unblocking key (PUK) for accessing the smart card may be provided by the personalization system 100. In such a case, these may subsequently also be provided to the shipping system 400, which may then send PIN and PUK to the user 500 separately to the smart card. Alternatively, PIN and PUK may for example be provided through the issuer 300, which may only provide these to the personalization system 100 for injection into the smart card in an encrypted form and separately also to a mailing system 600, preferably also encrypted. The mailing system 600 may then provide PIN and PUK to the user 500 separately to the smart card.

It will be understood that the personalization system 100 may also be associated to the issuer, e.g., run by the issuer 300. However, preferably the personalization system 100 may be independent from the issuer 300.

It will be understood that the above only roughly outlines the underlying method and mainly serves to illustrate parties involved in the process. The method will be discussed in more detail in the following.

Figure 2:
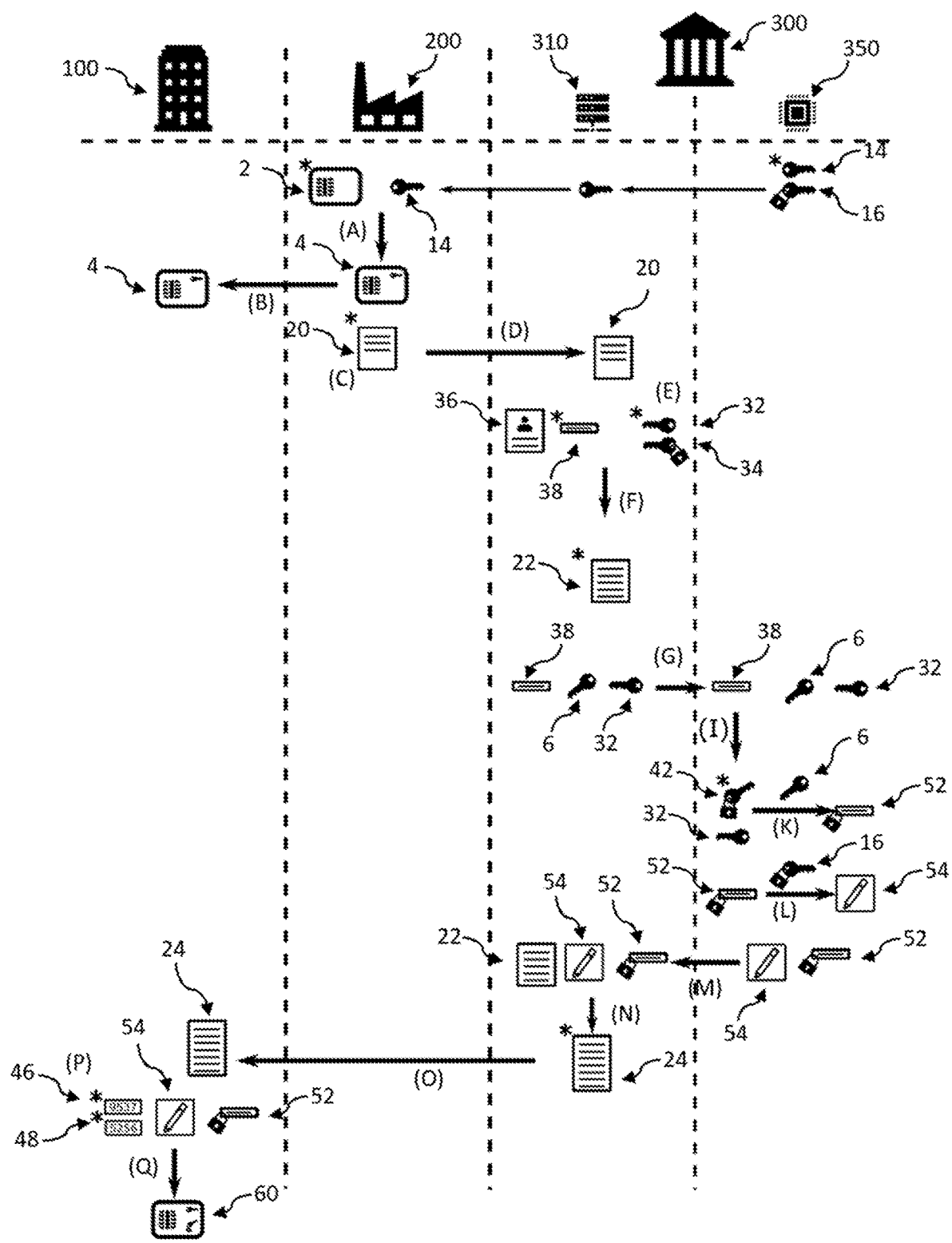
FIG. 2 depicts an exemplary embodiment of the present invention.

FIG. 2 depicts an embodiment of a method according to the present invention. More particularly, FIG. 2 depicts 4 panels, each indicating steps that may be performed by different apparatuses and/or entities. The leftmost panel relates to steps performed by the personalization system 100, the next panel to the right relates to steps performed by the provider system 200, the next panel to the right (i.e., third panel from the left) relates to steps performed by an issuer system 310 and the rightmost panel relates to steps performed by an issuer hardware security module 350. Generally, the issuer system 310 and the issuer hardware security module 350 may be under control of the issuer 300. The issuer system 310 may for example be an issuer server 310. The issuer hardware security module 350 may be comprised by the issuer system 310, i.e., it may be a secure portion within the issuer system 310. Alternatively, the issuer hardware security module 350 may be an independent hardware security module in connection with the issuer system 310, such that data can be exchanged therebetween. For example, it may be realized as a network hardware security module. More generally, it should be noted that each of the card provider system 200, the personalization system 100 and the issuer system 310 may typically comprise or be implemented as a data processing system, e.g., as a computer and preferably as a server which may comprise one or more hosts.

Very generally, an issuer 300 may provide a respective provider system 200 with a public issuer key 14, e.g., once it is decided that an issuer 300 would like to use services of a certain provider running the provider system 200. The public issuer key 14 may be associated with a private issuer key 16 held by the issuer 300, preferably in the issuer hardware security module (HSM) 350. In particular, the issuer key pair 14, 16 may be generated in the issuer HSM 350 and the private issuer key 16 may be safely kept within the issuer HSM 350, while the public issuer key 14 may be provided, e.g., transmitted, to external partners, particularly the provider system 200. It will be understood that the public issuer key 14 may be provided via the issuer system 310. That is, the issuer HSM 350 may first provide the public issuer key 14 to the issuer server 310 and the issuer server 310 may provide the public issuer key 14 to the provider system 200. For example, the issuer HSM 350 may provide the public issuer key 14 to the issuer system 310 upon generation thereof, and the issuer system 310 may store the public issuer key 14 and provide it to the provider system 200 whenever required. This may advantageously allow the issuer system 310 to provide the public issuer key 14 to a plurality of provider systems 200 (if required) without the issuer HSM 350 being required to re-provide the public issuer key 14 to the issuer server 310.

In step (A), the provider system 200 may initialize a smart card 2 to provide an initialized smart card 4. The smart card 2 (or user device 2) may be a blank smart card 2, i.e., a smart card that does not yet comprise any data related to a specific purpose, particularly no data relating to any issuer and/or user of said smart card. However, it will be understood that the smart card may already comprise a firmware, drivers and/or operating system. For example, the smart card 2 may comprise firmware provided to the smart card 2 by the provider system 200. In other words, prior to initializing the smart card 2, the provider system may load a respective firmware onto the smart card 2.

Initialization of the smart card 2 may comprise generating a device key pair 6, 8 comprising a public device key 6 and a private device key 8, wherein the private device key 8 is stored in the smart card 2. Preferably, the private device key 8 may be stored in a secure portion of the smart card 2. It is noted that preferably the smart card 2 itself as a whole may be considered a secure portion. In other words, a chip of the smart card may be considered as a secure environment that is temper proof, i.e., data cannot be read without proper credentials and allowance of the card and computations cannot be observed from the outside. The private device key pair 8, 10 may for example be an RSA key pair, preferably based on RSA-2048, i.e., an RSA number with 2048 bits and 617 decimal digits. Preferably, also the public device key 6 is stored on the smart card 2.

Similarly, initialization of the smart card 2 comprises generating an issuer authentication key pair comprising a public issuer authentication key 10 and a private issuer authentication key 12, wherein the private issuer authentication key 12 is also stored in the smart card 2. Again, the private issuer authentication key 12 may preferably be stored in the secure portion of the smart card 2. Preferably, also the public issuer authentication key 10 is stored in the smart card. The issuer authentication key pair 10, 12 may for example be an elliptic curve key pair, which may for example be used for digital signing of data structures, e.g., in the context of an elliptic curve digital signature algorithm (ECDSA). The issuer authentication key pair 10, 12 may allow the smart card to authenticate with the issuer 300 through verification of a digital signature. That is, while the private issuer authentication key 12 remains within the smart card 2, the public issuer authentication key 10 may generally be shared with the issuer 300, e.g., within the issuer system 310. Thus, the smart card 2 may be authenticated by the issuer through provision of a digital signature with the private issuer authentication key 12 that can be validated using the public issuer authentication key 10.

Both the issuer authentication key pair 10, 12 and the device key pair 6, 8 may preferably be generated on the smart card 2, e.g., using a true random number generator comprised by the smart card. This may advantageously allow for the respective private keys 8, 12 to remain secret as they may not be known outside of the smart card 2. In particular, this may prevent the provider system 200 from getting any knowledge about the private device key 8 and/or the private issuer authentication key 12.

Furthermore, initialization of the user device 2 (e.g., smart card) may comprise generating a serial number 18 and storing it on the user device 2 as well as injecting the public issuer key 14 into the user device 2. The serial number may for example be generated by the provider system 200 and injected into the user device 2 or it may be generated on the user device 2 itself, e.g., randomly.

Upon successful initialization, the provider system 200 may provide, e.g., send, the initialized smart card 4 in step (B) to the personalization system 100. It will be understood that the provider system 200 does not necessarily send the initialized smart card 4 on its own but instead for example prompts the initialized smart card 4 to be send to the personalization system 100.

In step (C), the provider system 200 may generate device initialization data 20. The device initialization data 20 may comprise the serial number 18, the public device key 6 and the public issuer authentication key 12. Subsequently, the provider system 200 may provide the device initialization data 20 to the issuer 300 and particularly the issuer system 310 (step (D)). It will be understood that providing data to another party generally refers to making the data accessible to said party. Thus, providing data may encompass sending data, but also for example enabling the other party to retrieve the data, e.g., via a download. That is, the data may for example also be provided by means of file transport protocol service (FTP), preferably by means of SSH file transport protocol (SFTP). Furthermore, providing the initialization data 20 to the issuer system 310 may comprise the provider system 200 encrypting the initialization data 20 and providing the encrypted initialization data to the issuer system 310 and the issuer system 310 decrypting the encrypted initialization data to retrieve the initialization data 20. This may advantageously allow to increase the security of the protocol as it may prevent unauthorised access to the initialization data 20.

The issuer system 310 may store at least part of the device initialization data 20. In particular, the issuer system 310 may store the public issuer authentication key 12, and potentially also the serial number and/or the public device key 6. Again, the public issuer authentication key 10 may allow the user device 2 to authenticate with the issuer 300 by means of a digital signature using the private issuer authentication key 12 stored on the user device 2.

In a next step (E) the issuer system 310 may generate a device authentication key pair 32, 34 comprising a public device authentication key 32 and a private device authentication key 34. Preferably, the device authentication key pair 32, 34 may be generated in a hardware security module (HSM) of the issuer system 310, which may also be referred to as issuer system HSM. Generally, said issuer system HSM may be separate to the issuer HSM 350, even though both may be comprised by the issuer system 310. In some embodiments the issuer system HSM and the issuer HSM 350 may be provided through a single HSM, however it may be preferred for the issuer system HSM and the issuer HSM 350 to be separate from each other. The device authentication key pair 32, 34 may for example be an elliptic curve key pair, which may for example be used for digital signing of data structures, e.g., in the context of an ECDSA. Similar to the issuer authentication key pair 10, 12, the device authentication key pair 32, 34 may allow the issuer 300 and particularly the issuer system 310 to authenticate with the smart card 2 through verification of a digital signature.

In step (F), the issuer system 310 may generate device data 22. It will be understood that this step may be optional. The device data 22 may comprise the device initialization data 20, user data 34, the public device authentication key 32 and a derivation element 38. The derivation element 38 may allow to derive a corresponding private key from a respective seed, which may be in possession of the issuer 300. In particular the seed may be safely kept within the issuer HSM

350. Deriving a key from a seed based on a derivation element may be achieved based on a key derivation function. Generally, the derivation element 38 may be associated with the user, that is, each user may be assigned a different derivation element 38. In other words, the derivation element 38 is uniquely attributed to a respective user, i.e., a client of the issuer 300. Each derivation may correspond to a deterministic key, e.g., a deterministic blockchain key. Thus, each user (i.e., client of the issuer 300) may be associated in an immutable way to a respective derivation, e.g., by means of the corresponding derivation element 38. A user may in some instances be associated to multiple derivations for multiple cards. The association of a user to a derivation may be stored in a secure database of the issuer 300, e.g., the issuer system 310. Thus, the immutable association of a user with a respective client may be given through said data base, e.g., by providing an association between the user and a respective derivation element 38 on which the derivation is based. The derivation element 38 may for example be a derivation number 38, such as a first order index of a derivation path, or the derivation element 38 may for example be a derivation path.

Subsequently, in a step (G), the issuer system 310 may provide at least the derivation element 38, the public device authentication key 32, and the public device key 6 to the issuer hardware security module 350. For example, the issuer system 310 may provide the device data 22 to the issuer HSM 350, or simply provide the desired data, i.e., derivation element 38, public device authentication key 32 and public device key 6 to the issuer HSM.

Again, in order to increase security of the process, the issuer system may digitally sign data with a respective private key prior to providing it to the issuer HSM 350, which may advantageously allow the issuer HSM 350 to verify that the data has not (internally) been tempered with, e.g., during transmission between the issuer system 310 and the issuer HSM 350. Such a verification would be based on verifying the digital signature based on a respective public key.

The issuer hardware security module 350 may in a step (I) calculate a user private key 42 based on the derivation element 38 and the seed held by the hardware security module 350. In other words, the user private key 42 may be determined using the derivation element 38, the seed, and a key derivation function. For example, the user private key 42 may be determined from the seed and based on the derivation element 38 in accordance with the BIP32 standard, i.e., the Bitcoin Improvement Proposal (BIP) 32 which relates to hierarchical deterministic wallets. Thus, the user private key 42 may for example be a blockchain private key 42 of the user. The user private key 42 may for example be an elliptic curve key, which may for example be used for digital signing of data structures, e.g., in the context of an elliptic curve digital signature algorithm (ECDSA). For example, the user private key may be based on the elliptic curve "secp256k1".

In a next step (K), the issuer hardware security module 350 may encrypt the user private key 42 and the public device authentication key 32 with the public device key 6 to provide encrypted data 52. This may ensure that the user private key 42 cannot be accessed outside of the issuer hardware security module 350 without having access to the respective private device key 8 which is held by the initialized smart card 4.

Furthermore, the issuer hardware security module 350 may digitally sign the encrypted data 52 using the private issuer key 16 associated with the public issuer key 14 that was injected into the smart card during initialization thereof to provide signed encrypted data 54 (step (L)). This may advantageously allow for the issuer hardware security module 350 to authenticate itself such that the smart card can validate the origin of the encrypted data 52.

In a next step (M), the issuer server HSM 350 may provide the encrypted data 52 and the signed encrypted data 54 to the issuer system 310, for example, the issuer server HSM 350 may send the data to the issuer system 310 or the issuer system 310 may retrieve the data from the issuer server HSM 350. The issuer system 310 may then generate personalization device data 24 (step (N)), which may comprise at least part of the device initialization data 20, preferably the serial number 18 and optionally further device initialization data, the encrypted data 52 and the signed encrypted data 54. Optionally, the personalization device data 24 may also comprise the user data 36, which may for example be advantageous for providing the personalized user device 60 to the user and/or printing the name of the user on the user device. The device initialization data 20 and user data 36 may for example still be stored in the issuer system 310 from previous steps (cf. Steps (D) and (F) or be taken from the respective device data 22 generated in step (F).

Subsequently, in step (O), the issuer system 310 may provide the personalization device data 24 to the personalization system 100. Again, the personalization device data 24 may for example be sent to the personalization system 100, provided through (S)FTP or by other means. Providing the personalization device data 24 to the personalization system 100 may comprise an encryption and decryption step adding an additional layer of security. That is, the issuer system 310 may encrypt the personalization device data 24 and provide the encrypted personalization device data to the personalization system 100, which may in turn decrypt the encrypted personalization device data to retrieve the personalization device data 24.

In a step (P), the personalization system 100 may generate a personal identification number (PIN) 46 and a personal unblocking key (PUK) 48. These may provide means for user authentication when accessing the personalized smart card 60.

The personalization system 100 may then in a next step (Q) inject the PIN 46, the PUK 48, the encrypted data 52 and the signed encrypted data 54 into the initialized smart card 4 to provide the personalized smart card. Again, since the personalization system does not have access to the private device key 8, it cannot decrypt the encrypted data 52 and thus cannot access the user private key 42.

Finally, the personalized smart card 60 may validate the signed encrypted data 54 using the public issuer key 14 and when successful, decrypt the encrypted data 52 to retrieve the user private key 42 and the public device authentication key 32. That is, the personalized smart card 60 may first check the signature of the issuer HSM 350 by validating that the signed encrypted data 54 was signed with the private issuer key 16. This validation may be based on the public issuer key 14 held by the personalized smart card 60. Subsequently, the personalized smart card 60 may decrypt the encrypted data 52 using its private device key 8 that is only known to the smart card. Thus, the user private key 42 is safely transferred to the smart card 2 without allowing any third party to access the user private key 42, therefore preventing fraudulent use thereof.

Thus, upon successful provision of the personalized smart card 60, the smart card comprises the private device key 8, the private issuer authentication key 12, the serial number, the public issuer key 14, the PIN 46, the PUK 48, the public device authentication key 32 and the user private key 42. At the same time, the issuer 300 is in possession of the private issuer key 16, the public device key 6, the public issuer authentication key 12, and the private device authentication key 34, wherein at least the private device authentication key 34, and private issuer key 16 are held in hardware security modules. More particularly, the user private key 42 and the private issuer key 16 may be held in the issuer HSM 350, while the private device authentication key 34 may be held in the issuer system HSM.

It will be understood that device initialization data 20, device data 22, and/or personalization device data 24 may comprise data relating to a plurality of user devices. That is, data corresponding to a plurality of user devices may be collected and combined in respective data files. This may advantageously increase efficiency of the process as data exchange between parties may not be required for each user device individually.

Preferably, the present method may further comprise means for ensuring that the initialized user device 4 and/or the personalized user device 60 is actually provided by the provider system 200. This may advantageously allow to verify that the initialized and/or personalized user device is genuine in that it was indeed initialized by the provider system 200 and thus prevent third parties from faking the initialized user device and ensuring that respective keys were indeed generated in a secure manner and are unknown to any third party.

In particular, the provider system 200 may possess a private root key 78 only known to the provider, which may be utilized to digitally sign the public device key 6 and/or the public issuer authentication key 10. A key signed by the private root key 78 may be considered to constitute a certificate, which may optionally also comprise information on the issuer of the certificate, i.e., the provider. Such a certificate may be considered a child certificate of a respective root certificate comprising the public root key 76 and a signature of the public root key 76 with the private root key, as well as optionally some additional information. A third party 700 can confirm validity of the certificate by validating the signature by means of the respective public root key 76 associated with the private root key 78.

Figure 3:
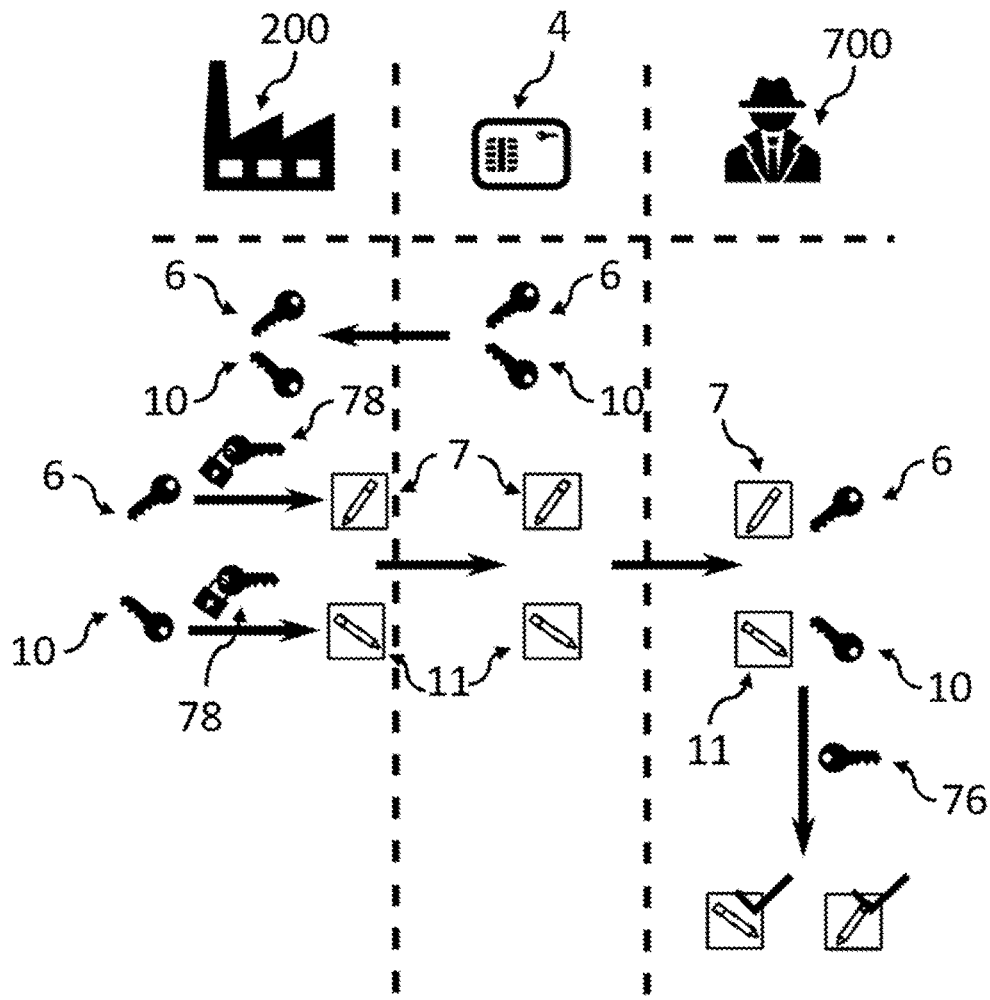
FIG. 3 depicts steps relating to a check of authenticity/genuineness of user device data.

With reference to FIG. 3, upon or during initialization of the user device 2 and particularly once the device key pair 6, 8 and the issuer authentication key pair 10, 12 are generated, the public device key 6 and/or the public issuer authentication key 10 may be provided to the provider system 200. The provider system 200 may then digitally sign the public device key 6 and/or the public issuer authentication key 10 to provide a root-signed device key 7 and/or a root-signed issuer authentication key 11, which may also be referred to as respective certificates 7, 11. The root-singed key(s) 7, 11 may then be provided to the user device 4, which may store them for later use. A third party 700, e.g., the issuer 300 or any other party interacting with the user device 4, may now validate the Genuity of the user device 2 by validating the signature of one (or more) root-signed key(s) 7, 11. In other words, a third party 700 may check the validity of at least one certificate 7, 11. In particular, the user device 4 may provide a root-signed key 7, 11 and the respective public key 6, 10 to the third party 700, e.g., in reaction to a respective challenge. The third party 700 may then use the public root key 76, associated with the private root key 78 that is only known to the provider system 200, to verify the respective digital signature. By verifying the digital signature, the origin of the data on the user device 4 can be verified as only the provider system 200 has access to the private root key 78. Thus, by verifying at least one of the root-signed keys 7, 11, the third party 700 may convince itself of the Genuity of the user device 4, and particularly the root-signed keys 7, 11.

The provider system 200 may in some embodiments only digitally sign the public issuer authentication key 10 to provide the root-signed issuer authentication key 11. In such embodiments, instead of digitally signing the public device key 6 with the private root key 78, the public device key 6 may be digitally signed with the private issuer authentication key 12. This allows to ensure authenticity (or genuineness) of the device key pair 6, 8 through a respective chain of digital signatures: The authenticity of the issuer authentication key pair 10, 12 may be established via the root-signed issuer authentication key 11 and subsequently the authenticity of the device key pair 6, 8 may be established through verifying the digital signature of the public device key 6 (i.e., the signed device key) with the private issuer authentication key 12 for which the authenticity is established through the root-signed issuer authentication key 11.

Thus, by means of the private root key 78 of the provider system 200 authenticity (or genuineness) of the data on the user device and particularly the keys of the user device may be ensured, or respectively proven to third parties. In other words, through digital signature with the private root key 78 the provider system 200 indicates that the user device and particularly the data on the user device and more particularly the key(s) on the user device are genuine. This can be verified by any third party 700 with access to the public root key 76, which may for example be provided, e.g., made publicly available, by the provider system 200.

When root-signing at least one of the keys of the initialized user device 4, the provider system 200 may further include the respective root-signed key 7, 11 in the provided device initialization data 20, thereby allowing the issuer 300 and particularly the issuer system 310 to verify Genuity of the transmitted data, particularly the public issuer authentication key 10 and/or the public device key 6. For example, the provider system 200 may digitally sign the public issuer authentication key 10 with the private root key 78 and provide the resulting root-signed issuer authentication key 11 to the issuer 300, e.g., as part of the device initialization data 20. The issuer 300 and particularly the issuer system 310 may then verify authenticity of the public issuer authentication key 10 through verification of the root-signed issuer authentication key 11 using the public root key 76. Similarly, genuineness/authenticity of the public device key 6 may also be established via a root-signed device key 7 or a public device key 6 digitally signed with the private issuer authentication key 12 as described above.

Figure 4A:
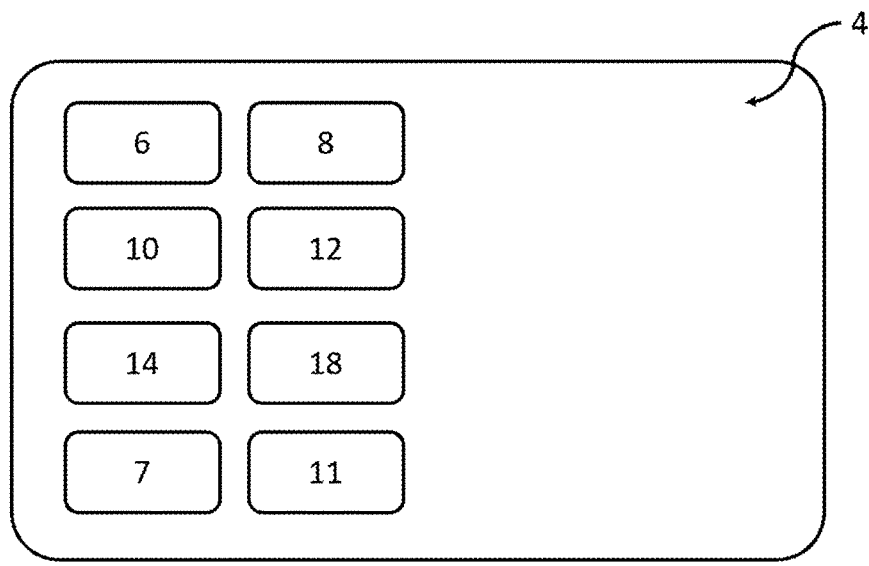
FIG. 4a depicts an exemplary initialized user device.

With reference to FIG. 4a, the initialized user device 4 may generally comprise at least the private device key 8, the private issuer authentication key 12, the serial number 18, and the public issuer key 14. Preferably, the user device 4 may further comprise the public device key 6 and the public issuer authentication key 10. Furthermore, the initialized user device 4 may also comprise the root-signed authentication key 11. Additionally, the user device 4 may comprise the root-signed device key 7, or alternatively a digitally-signed public device key (i.e., the signed device key; not shown) which is signed with the private issuer authentication key 12.

While the device key pair 6, 8 and the issuer authentication key pair 10, 12 may be generated by the user device, the public issuer key 14 and the root-signed key(s) 7, 11 are provided by the issuer system 200, e.g., these may be injected into the user device.

The serial number 18 may either be generated on the user device or provided by the provider system 200.

Figure 4B:
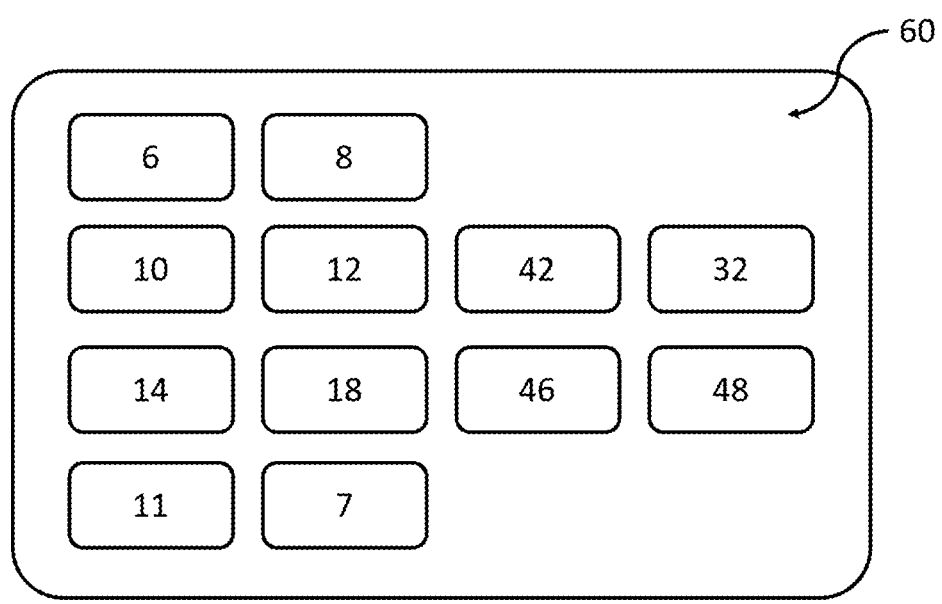
FIG. 4b depicts an exemplary personalized user device.

With reference to FIG. 4b, the personalized user device 60 may further comprise the user private key 42, the public device authentication key 32, the PIN 46 and the PUK 48.

Figure 5:
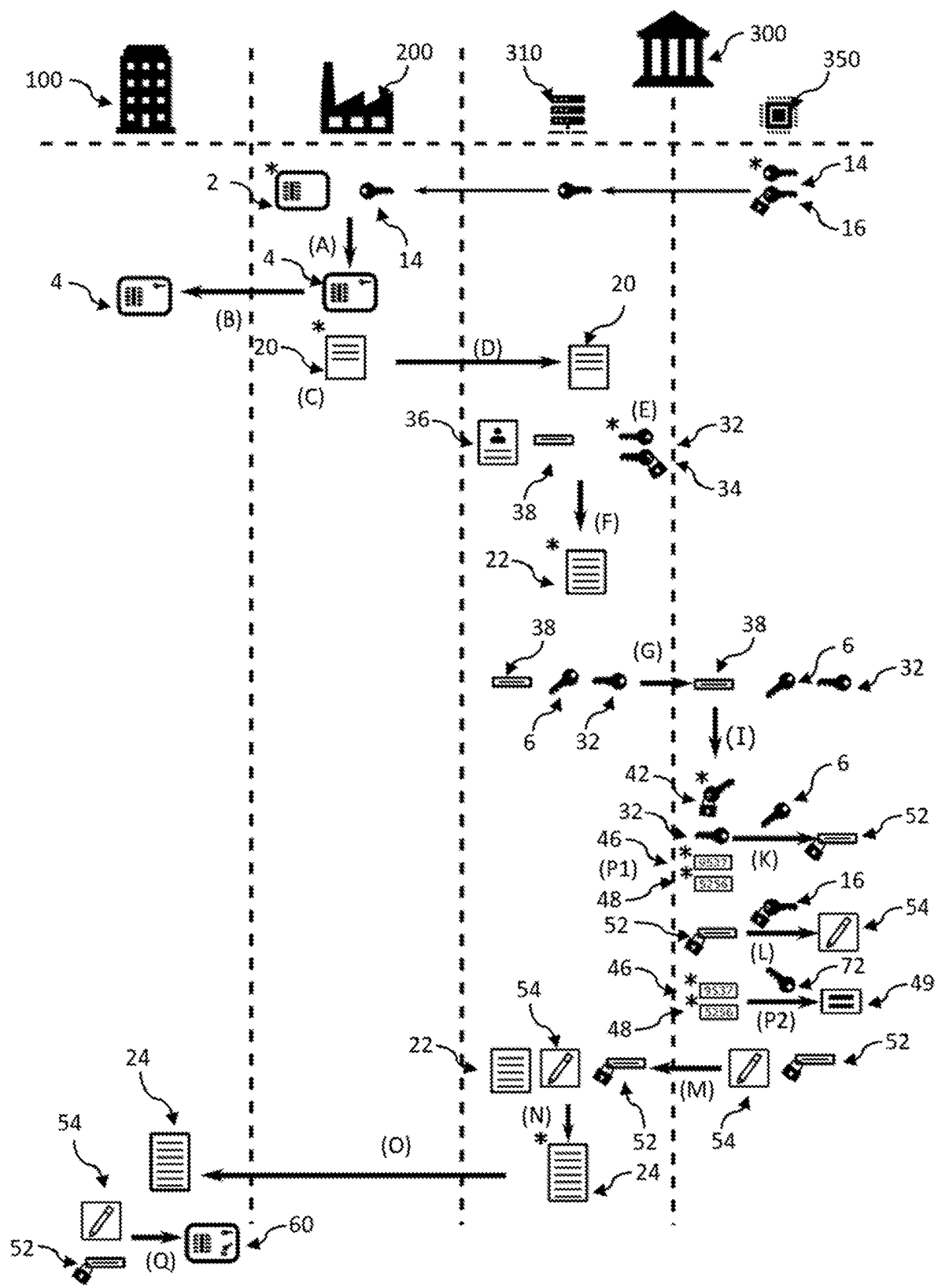
FIG. 5 depicts another exemplary embodiment of the present invention.

With respect to FIG. 5, another embodiment of the present invention is described, wherein the PIN 46 and PUK 48 are not generated by the personalization system 100, but instead are generated by the issuer HSM 350. That is, generally, the method depicted in FIG. 3 is similar to the method depicted in FIG. 2. Particularly, it may be identical up to and including the calculation of the user private key 42 by the issuer HSM 350 (step (I)).

However, prior to providing the encrypted data 52 in step (K), the issuer HSM 350 may generate the PIN 46 and the PUK 48 (step (P1)). Subsequently, the issuer HSM 350 may encrypt the user private key 42, the public device authentication key 32 and additionally the PIN 46 and PUK 48 with the public device key 6 to provide encrypted data 52 (step (K)). Thus, in comparison to the embodiment discussed with respect to FIG. 2 the encrypted data additionally comprises PIN 46 and PUK 48.

Similar to the above, in step (L) the issuer HSM 350 may then digitally sign the encrypted data 52 using the private issuer key 16 to provide the signed encrypted data 54. Again, the public issuer key 14 may be injected into the smart card (i.e., user device) during initialization (step A). Thus, authentication of the issuer HSM 350 may be ensured since the private issuer key 16 is only known to the issuer HSM 350, thus allowing the smart card to validate the origin of the encrypted data 52 upon injection thereof.

In addition, the issuer HSM 350 may encrypt PIN 46 and PUK 48 using a public key 72 of a mailing system 600 to provide encrypted personal data 49 (step (P2)). The mailing system 600 may be responsible for providing PIN 46 and PUK 48 to the user 500. Typically, such a mailing system 600 may for example be provided by a mailing agency that will provide the PIN 46 and PUK 48 to the user 500 vial mail (digitally or on paper). Thus, the public key 72 may also be referred to as public mailing key 72.

The encrypted personal data 49 may then be provided to the mailing system 600, which is in possession of a private mailing key that forms a key pair with the public mailing key 72. That is, the mailing system 600 may initially generate a mailing key pair comprising the public mailing key 72 and the private mailing key and subsequently provide the respective public mailing key 72 to the issuer 300 to be injected into the issuer HSM 350.

Thus, the mailing system 600 may decrypt the encrypted personal data 49 using the private mailing key and thus gain access to the PIN 46 and PUK 48. Subsequently, the mailing system 600 may provide the PIN 46 and PUK 48 to the user 500, e.g. vial mail or digitally.

As discussed above, the issuer HSM 350 may in a next step (M) provide the encrypted data 52 and the signed encrypted data 54 to the issuer system 310. Subsequently in step (N) the issuer system 310 may generate personalization device data 24, which may comprise at least part of the device initialization data 20, preferably at least the serial number 18, the encrypted data 52 and the signed encrypted data 54, optionally also the user data 36. Subsequently, in step (O), the issuer system 310 may provide the personalization device data 24 to the personalization system 100.

Once received by the personalization system 100, the encrypted data 52 and the signed encrypted data 54 may be injected into the initialized smart card 4 (i.e., the initialized user device 4) to provide the personalized smart card 60 (step (Q)).

Using the public issuer key 14, the personalized smart card 60 may validate the signed encrypted data 54 and thus ensure that the data originates from the issuer HSM 350. When successful, the smart card may decrypt the encrypted data to retrieve the private issuer key 42, the public device authorization key 32, the PIN 46 and the PUK 48. That is, the smart card may first check the signature of the issuer HSM 350 by validating that the signed encrypted data 54 was signed with the private issuer key 16. This validation may be based on the public issuer key 14 injected into the smart card during initialization (cf. step (A)). Subsequently, the smart card may decrypt the encrypted data 52 using its private device key 8 that is only known to the smart card. Thus, the user private key 42 is safely transferred to the smart card 2 without allowing any third party to access the user private key 42, therefore preventing fraudulent use thereof.

In addition, this embodiment allows for preventing the personalization system to gain access to PIN 46 and PUK 48. That is, since PIN 46 and PUK 48 are not generated by the personalization system 100 but by the issuer HSM 350 and provided to the user via a mailing system 600, an additional layer of security may be added. In particular, it may be prevented that a malicious individual with access to the personalization system 100 may gain knowledge of PIN 46 and PUK 48, while also having access to the personalized smart card 60. That is, since the mailing system 600 provides the PIN 46 and PUK 48 to the user 500 separately to the personalized smart card 60 and without ever having access to the personalized smart card 60 itself, no party other than the user 500 will be in the possession of PIN 46 and/or PUK 48, and the personalized smart card 60. Thus, an additional layer of security may be provided.

In another embodiment, the method may not rely on a personalization system 100 but instead the user 500 and more particularly a user system may receive the initialized user device 4. The user and/or user system may receive the initialized user device 4 from the provider system 200, from the issuer 300 or a third party, e.g., an intermediary such as a shop. Subsequently, the user system may extract at least some of the data present on the initialized user device 4 from said initialized user device 4. In that regard, the user system may comprise at least one user end device such as a smartphone, laptop, workstation or other suitable device. The extracted data may comprise the public device key 4 and the public issuer authentication key 12.

Once the user system has extracted the data, the user may authenticate himself with the issuer 300 and particularly the issuer system 310. Such an authentication may preferably be performed via the user system. For example authentication may use the same or a different user end device comprised by the user system. In other words, the user may authenticate himself with the issuer system 310 using the user system, preferably a user end device comprised thereby. Upon successful authentication, the user system may transmit at least a portion of the data extracted from the initialized user device 4 to the issuer system 310. In other words, the user system may transmit, e.g., send, initialization data 20 to the issuer system 310. More particularly, the user system may transmit initialization data 20 comprising the issuer authentication key 12 and the public device key 6 to the issuer system 310. Transmitting the initialization data 20 may for example be performed using the same user end device as for extracting the data, but it may also use a different user end device comprised by the user system.

The issuer system 310 and issuer HSM 350 may then perform the steps (E) to (M) as described with above with reference to FIGS. 2 and 5. Furthermore, the issuer system may also generate the personalization data 24 (cf. step (N) above), however the personalization data 24 may not necessarily comprise the serial number. That is, the personalization data 24 may at least comprise the encrypted data 52 and the signed encrypted data 54. Once the issuer system 310 has generated the personalization data 24 (step (N)), the personalization data is transmitted to the user system, e.g., the user end device that also transmitted the initialization data. The user system may then inject the encrypted data 52 and the signed encrypted data 54 into the initialized user device 4 to provide the personalized user device 60. As described above, the personalized user device 60 may validate the signed encrypted data 54 using the public issuer key 14 and when successful, decrypt the encrypted data 52 to retrieve the user private key 42 and the public device authentication key 32.

The user system may comprise at least one user end device. In some embodiments the user system may comprise a single user end device, alternatively the user system may comprise a plurality of user end devices.

PIN 46 and PUK 48 may either be chosen by the user 500 and injected into the user device via the user system or alternatively, be randomly generated by the issuer and particularly the issuer HSM as for example described with reference to FIG. 5, i.e., the PIN 46 and PUK may be comprised by the encrypted data 52.

As discussed, in some embodiments the issuer HSM 350 may be comprised by the issuer system 310 and in some embodiments the issuer system HSM and the issuer HSM 350 may even be provided through a single HSM. Furthermore, in some embodiments of the present invention, the issuer system 310 performs all previously described steps associated with the issuer system 310, the issuer HSM 350 and the issuer system HSM. That is, the method may be performed without using an HSM. However, embodiments comprising an issuer HSM 350 performing at least some of the method steps may be preferred owing to an increased security.

While in the above embodiments, the user private key 42 is determined based on a derivation element 38 it will be understood that in other embodiments, the user private key may be determined without use of a derivation element 38, e.g., randomly generated using a true random number generator.

The present invention may for example be utilized by a bank acting as issuer 300 that wishes to provide personalized user devices 60, e.g., personalized smart cards 60, to a user 500. Thus, the issuer 300 may contract a provider of such user devices 2, which may run a provider system 200. Furthermore, the issuer 300 may provide the provider system 200 with the public issuer key 14. In particular, the issuer 300 may generate an issuer key pair 14, 16 within an HSM, preferably within the issuer HSM 350, i.e., an HSM owned by the issuer, e.g., the bank. This public issuer key 14 will be injected in each user device provided for the respective issuer 300 to allow the smart card to verify encrypted data 52 provided by the issuer HSM 350.

The provider may for example sell user devices 2 in packs of N to the issuer 300, it will be understood that N may also be equal to 1. That is, the provider may also sell single user devices, i.e., packs of 1 user device.

The user devices 2 may be initialized by the provider system 200. That is, every user device 2 may be provided with a respective serial number, e.g., an alphanumeric serial number. The serial number 18 may for example be generated by the provider system 200 and injected into the user device 2 or it may be generated on the user device 2 itself, e.g., randomly. Additionally, the user device may generate a device key pair comprising a public device key 6 and a private device key 8. For example, the user device may during initialization thereof be prompted to generate the respective device key pair, e.g., through usage of a firmware on the user device. In particular, the user device may be equipped with a true random number generator that may be utilized to generate the respective device key pair 6, 8. The device key pair 6, 8 may be an RSA key pair, preferably based on RSA-2048, i.e., an RSA number with 2048 bits and 617 decimal digits. The private device key 8 may remain within the user device 2, while the public device key 6 may be shared with other entities, e.g., the issuer 300 and particularly the issuer system 310 and/or the issuer HSM 350. This may allow the issuer 300 (or anyone else in possession of the public device key 6) to provide encrypted data to the user device 2 that can only be decrypted using the private device key 6 that remains within the initialized user device 4 or the personalized user device 60, respectively.

Additionally, the user device may generate an issuer authentication key pair comprising a public issuer authentication key 10 and a private issuer authentication key 12. For example, the user device may during initialization thereof be prompted to generate the respective issuer authentication key pair, e.g., through usage of a firmware on the user device. Again, the true random number generator may be utilized to generate the respective issuer authentication key pair 10, 12. The issuer authentication key pair 10, 12 may for example be an elliptic curve key pair, which may for example be used for digital signing of data structures, e.g., in the context of an elliptic curve digital signature algorithm (ECDSA). For example, the issuer authentication key pair 10, 12 may be based on the elliptic curve "secp256r1". The issuer authentication key pair 10, 12 may allow the user device to authenticate with the issuer 300 through verification of a digital signature. That is, while the private issuer authentication key 12 may remain within the user device 2, the public issuer authentication key 10 may generally be shared with the issuer 300, e.g., within the issuer system 310. Thus, the initialized user device 4 or respectively the personalized user device 60 may be authenticated by the issuer 300 through provision of a digital signature with the private issuer authentication key 12 that can be validated using the public issuer authentication key 10.

These user device(s) 2 may not necessarily be provided to the issuer 300 itself but instead to a personalization system 100, e.g., to a personalization bureau running a personalization system 100. However, in some instances the personalization system 100 may for example also be run by the issuer 300, albeit being separate to the issuer system 310 and the issuer HSM 350.

The issuer 300 may however receive respective initialization data 20 that may be generated by the provider system 200 and subsequently be provided to the issuer 300, e.g., it may be send to the issuer or for example be provided as a downloadable file for example via FTP/SFTP. The initialization data 20 may comprise serial number, public device key 6 and public issuer authentication key 12 associated with user devices of the device pack. In other words, the issuer 300 may be provided with initialization data 20 corresponding to all user devices comprised in a device pack. Again, this may also be a single user device in which case the issuer 300 may be provided with separate initialization data 20 for each user device.

In some cases, initializing the user device 2 may further comprise generating a genuineness check element for a checking genuineness of a user device 2. In such cases the initialization data 20 may further comprise said genuineness check element. In particular, the provider system 200 may use a private root key 78 to digitally sign the public issuer authentication key 10 and/or the public device key 6 to provide respective root-signed keys 7, 11, which may also be referred to as certificates and which may provide a genuineness check element. Such a root-signed key 7, 11 may allow third parties to confirm genuineness/authenticity of the device and particularly the respective keys as described above.

Furthermore, if the user devices are sold in packs, each pack may also be associated with a device pack serial number, which may be included in the initialization data 20, e.g., in a header of a respective file.

Generally, the initialization data 20 may for example be provided as a file, e.g. a csv-file. In some instances, the respective file may further already comprise additional spaces for further information, e.g., information relating to the user 500 that may for example be added through the issuer 300.

Once the issuer 300 and preferably the issuer system 310 receives the initialization data 20, the number of available user devices may be increased. In other words, the stock of available user device may be increased. Generally, user devices may be used in packs and on a first in-first out basis. That is, first all user devices of a respective pack may be used before user devices of another pack are used.

For issuing a user device, the issuance system 310 may first check whether use of a certain initialization-data file has been started. Or, respectively, if use of a corresponding device pack has been started. In other words, the issuer system 310 may identify the initialization data 20, or respectively the device pack that is currently used (or next to be used). Once identified, the issuer system 310 may then iterate through the initialization data 20 to identify a free user device, i.e., an initialized user device 4 that has not been issued. This may for example be the first user device 4 within the initialization data 20 that has not been issued.

The issuer system 310, which may for example comprise at least one server, may then generate a device authentication key pair, i.e., a unique pair of keys that may enable the issuer system 310 to authenticate itself to the user device, e.g., through verification of a digital signature. This may allow for a 2-factor authorization. Generally, the device authentication key pair may comprise a public device authentication key 32 and a private device authentication key 34, wherein the private authentication key 34 remains with the issuer 300. The device authentication key pair 32, 34 may for example be an elliptic curve key pair, which may for example be used for digital signing of data structures, e.g., in the context of an elliptic curve digital signature algorithm (ECDSA). For example, the device authentication key pair 32, 34 may be based on the elliptic curve "secp256r1". Preferably, the device authentication key pair 32, 34 may be generated in a HSM of the issuer system 310. The HSM of the issuer system 310 may comprise a true random number generator which may be utilized to generate the device authentication key pair 32, 34. A different device authentication key pair may be generated for each user device.

The issuer system 310 may then add user data 36, e.g., name and shipping address of the user 500 requesting the user device, a derivation element 38 for deriving a user private key 42 from a seed, and the respective public device authentication key 32 to the initialization data 20, thereby (at least partially) generating respective device data 22. The issuer system 310 may for example amend the initialization data 20, e.g., the initialization-data file, or create new data, e.g., a new device-data file. Thus, the device data 22 may comprise all information comprised in the initialization data 20 and additionally the user data 36, the derivation element 38, and the public device authentication key 32 for the respective user devices, e.g., for each of the devices in a pack.

The issuer system 310 may then check whether all devices within the initialization data 20, e.g., the initialization-data file, have been used. In other words, the issuer system 310 may check whether all devices comprised in a respective device pack have been used.

Subsequently, the issuer system 310 may iterate over the device data 22 and provide, e.g., send, derivation element 38, public device key 6 and public device authentication key 32 associated with the same user device to the issuer HSM 350. That is, the issuer system 310 may only provide respective data to the issuer HSM 350 when all devices of a device pack have been used. Alternatively, the issuer system 310 may provide these data for each device or a subgroup of devices in a device pack to the issuer HSM 350. Preferably, the data transmitted to the issuer HSM 350 may be secured, e.g., through encryption thereof.

Again, in order to increase security of the process, the issuer system may digitally sign data with a respective private key prior to providing it to the issuer HSM 350, which may advantageously allow the issuer HSM 350 to verify that the data has not (internally) been tempered with, e.g., during transmission between the issuer system 310 and the issuer HSM 350. Such a verification would be based on verifying the digital signature based on a respective public key.

Alternatively, particularly if the issuer HSM 350 is external to the issuer server, the device data 22 may be provided to the issuer HSM 350, particularly the computing device comprising the issuer HSM 350 (thereby providing derivation element 38, public device key 6 and public device authentication key 32), which may in turn iterate over the device data 22 and inject the respective derivation element 38, public device key 6 and public issuer authentication key into the issuer HSM 350.

Subsequently, the issuer HSM 350 may calculate a user private key 42 for the corresponding user device based on the derivation element 38 and a respective seed comprised by the issuer HSM 350. The user private key 42 may for example be a blockchain private key 42. For example, the user private key may be derived as a child key based on BIP 32. Subsequently, the issuer HSM 350 may encrypt the user private key 42 together with the public device authentication key 32 using the respective public device key 6. Thus, the issuer HSM 350 may provide encrypted data 52 separately for each user device. This may advantageously allow to prevent any unauthorized access to the user private key 42 as decryption of the encrypted data 52 is only possible when possessing the respective private device key 8. Thus, the encrypted data 52 is unambiguously associated to a specific user device.

Again in some embodiments of the present invention, the issuer HSM may further generate PIN 46 and PUK 48 for accessing the personalized user device 60, in which case also PIN 46 and PUK 48 may be comprised by the encrypted data

52. That is, the issuer HSM 350 may encrypt PIN 46 and PUK 48 together with the user private key 42 and the public device authentication key 32.

Furthermore, the issuer HSM 350 may utilize the private issuer key 16 to digitally sign the encrypted data 52 and thereby provide the signed encrypted data 54. The private issuer key 16 is associated with the public issuer key 13 injected into each user device 2 during initialization and thus allowing each user device to validate the digital signature and thereby authenticate the origin of the encrypted data 52.

The issuer HSM 350 may provide the encrypted data 52 and the signed encrypted data 54 to the issuer server 310. Once these are provided for a set of derivation element 38, public device key 6 and public device authentication key 32, the issuer HSM 350 may be provided with the next set corresponding to another device and similarly provide respective encrypted data 52 and signed encrypted data 54.

The issuer system 310 may further provide personalization device data 24 to the personalization system. The personalization device data 24 may for example be provided via FTP/SFTP or send directly to the personalization system 100. The personalization device data 24 may comprise at least part of the initialization data 20, e.g. the serial number, the encrypted data 52 and the signed encrypted data 54, and optionally the user data 36. Again, the personalization device data 24 may thus comprise data relating to all user devices comprised in a device pack, or alternatively, a subgroup of the user devices comprised in a device pack, such as a single user device.

When receiving the personalization device data, the personalization system 100 may identify the device pack corresponding to the personalization device data 24. In some embodiments, an employee of the personalization bureau running the personalization system may identify the respective device pack. Identifying the respective device pack may for example be performed based on the device pack serial number, which may be comprised by the personalization device data, e.g., in the header of a personalization device data file.

The personalization system 100 may match a user device and the respective data in the personalization device data, e.g., based on the serial number of the initialized user device 4. In some embodiments, the personalization system 100 may further generate a PIN 46 and PUK 48. In such cases the personalization system 100 may then inject PIN 46, PUK 48, the encrypted data 52 and the signed encrypted data 54 into the initialized user device 4 to provide the personalized user device 60.

In embodiments, wherein PIN 46 and PUK 48 are generated by the issuer HSM 350, the personalization system 100 may simply inject the encrypted data 52 and the signed encrypted data 54 into the initialized user device 4 to provide the personalized user device 60.

The personalized user device 60 may then validate the signed encrypted data 54 based on the public issuer key 14 and upon success, decrypt the encrypted data using the private device key 8. Thereby the personalized user device 60 may retrieve the user private key 42 and the public device authentication key 32, as well as in respective embodiments PIN 46 and PUK 48.

The personalization system 100 may further indicate user name and serial number on the user device 60, e.g., print them onto the personalized user device 60. Optionally, the personalization system 100 may then provide result data indicating a result of the personalization with respect to a user device's serial number. This may advantageously allow to check whether the personalization was successful and/or for which user device there may have been issues.

Furthermore, the personalization system may provide shipping data, which may comprise serial number, user name and shipping address of a respective user 500. Furthermore, the shipping data may also comprise PIN 46 and PUK 48, if they were generated by the personalization system 100. Again, the shipping data may comprise data relating to a single user device or a plurality of user devices, e.g., each user device of a device pack.

The shipping data (and optionally result data) may then be provided to (e.g., send to) the shipping system 400, which may in turn iterate over the shipping data and ship the respective user device preferably with an accompanying letter. In cases, where PIN and PUK have been generated by the personalization system 100, PIN and PUK may as well be send to the user by the shipping system 400, wherein PIN and PUK may preferably be send with a letter separate to shipment of the user device.

Finally, the shipping system may indicate to the issuer 300 that the user device has been shipped.

In embodiments, wherein PIN 46 and PUK 48 are generated by the issuer HSM 350, PIN 46 and PUK 48 may additionally be encrypted by the issuer HSM 350 using a public mailing key 72 provided by a mailing system 600, e.g., a mailing agent 600 that may provide, e.g., mail, PIN 46 and PUK 48 to the user separately. That is, the issuer HSM 350 may encrypt PIN 46 and PUK 48 together to generate encrypted personal data 49 utilizing a public mailing key 72, which is associated with a private mailing key held by the mailing system 600. Subsequently, the encrypted personal data 49 may be provided to the mailing system 600. To add an additional layer of security, the issuer HSM 350 may digitally sign the encrypted personal data 49 prior to providing it to the mailing system, for example with the private issuer key 16. This may advantageously enable the mailing system 600 to authenticate the origin of the digitally signed encrypted personal data 49.

The mailing system 600 may then decrypt the encrypted personal data 49 utilizing a private mailing key associated with the public mailing key 72 to retrieve PIN 46 and PUK 48. In some embodiments, the encrypted personal data 49 may further also comprise at least part of the user data 36, particularly name and address of the user 500 associated with the respective PIN 46 and PUK 48. Alternatively, name and address of the respective user 500 may be provided alongside the encrypted personal data 49 in such a way that unambiguously relates PIN 46 and PUN 48 to a respective name and address. The mailing system 600 may then provide PIN 46 and PUK 48 to the respective user, e.g., mail a respective letter comprising the relevant information to the user 500. Furthermore, the mailing system 600 may inform the issuer 300 once PIN 46 and PUK 48 have been provided to the user 500.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A method for issuance of a personalized user device, wherein the method comprises:
    initializing a user device to provide an initialized user device, wherein initializing comprises:
        generating a device key pair comprising a public device key and a private device key and storing the private device key in the user device;
        generating an issuer authentication key pair comprising a public issuer authentication key and a private issuer authentication key and storing the private issuer authentication key in the user device;
        generating a serial number and storing the serial number in the user device; and
        injecting a public issuer key into the user device;
        wherein the user device comprises a true random number generator and wherein the device key pair and/or the issuer authentication key pair are generated using the true random number generator;
    providing device initialization data to an issuer system, wherein the device initialization data comprises the public device key and the public issuer authentication key;
    the issuer system generating a device authentication key pair comprising a public device authentication key and a private device authentication key;
    calculating a user private key configured to digitally sign data elements;
    encrypting the user private key and the public device authentication key with the public device key to provide encrypted data;
    digitally signing the encrypted data using a private issuer key associated with the public issuer key to provide signed encrypted data;
    the issuer system providing personalization device data, wherein the personalization device data comprises the encrypted data and the signed encrypted data;
    injecting the encrypted data and the signed encrypted data into the initialized user device to provide the personalized user device; and
    the personalized user device validating the signed encrypted data using the public issuer key and when successful decrypting the encrypted data to retrieve the user private key and the public device authentication key.

2. The method according to claim 1, wherein the method comprises:
    the issuer system providing the public device key, and the public device authentication key to an issuer hardware security module;
    the issuer hardware security module calculating the user private key;
    the issuer hardware security module encrypting the user private key and the public device authentication key with the public device key to provide encrypted data; and
    the issuer hardware security module digitally signing the encrypted data using a private issuer key associated with the public issuer key to provide signed encrypted data.

3. The method according to claim 2, wherein the user private key is calculated based on a derivation element;
    wherein the method further comprises the issuer system providing the derivation element to the issuer hardware security module; and
    wherein the issuer hardware security module comprises a seed and wherein the user private key is calculated based on the derivation element and the seed using a key derivation function.

4. The method according to claim 1, wherein the method comprises:
    a provider system providing the initialized user device to a personalization system;
    the provider system providing the device initialization data to the issuer system, wherein the device initialization data further comprises the serial number;
    the issuer system providing personalization device data to the personalization system, wherein the personalization device data further comprises the serial number; and
    the personalization system injecting the encrypted data and the signed encrypted data into the initialized user device to provide the personalized user device.

5. The method according to claim 4, wherein the method further comprises:
    the personalization system generating a PIN and a PUK; and
    the personalization system injecting the PIN and the PUK into the initialized user device or the personalized user device.

6. The method according to claim 1, wherein the user device is a smart card.

7. The method according to claim 1, wherein the user private key is calculated based on a derivation element.

8. The method according to claim 1, wherein the method further comprises:
    generating the PIN and the PUK; and
    wherein the step of encrypting the user private key and the public device authentication key with the public device key to provide encrypted data comprises encrypting the user private key, the public device authentication key, the PIN and the PUK with the public device key to provide the encrypted data.

9. The method according to claim 1, wherein initializing further comprises:
    the user device providing the public issuer authentication key to the provider system;
    the provider system digitally signing the public issuer authentication key with a private root key to provide a root-signed issuer authentication key;
    the provider providing the root-signed issuer authentication key to the user device; and
    the user device storing the root-signed issuer authentication key.

10. The method according to claim 9, wherein the method further comprises the user device:

digitally signing the public device key with the private issuer authentication key to provide a signed device key; and storing the signed device key.

11. The method according to claim 1, wherein initializing further comprises:

the user device providing the public device key to the provider system;

the provider system digitally signing the public device key with the private root key to provide a root-signed device key;

the provider providing the root-signed device key to the user device; and the user device storing the root-signed device key.

12. The method according to claim 1, wherein the method further comprises providing the personalized user device to a user.

13. The method according to claim 1, wherein the issuer authentication key pair allows the user device to authenticate with an issuer system through verification of a digital signature.

14. The method according to claim 1, wherein the device authentication key pair allows the issuer system to authenticate with the user device through verification of a digital signature.

15. A personalized user device comprising:
a processor;
a memory;
a private device key;
a private issuer authentication key;
a public issuer key;
a serial number;
a user private key configured to digitally sign data elements;
a public device authentication key;
a PIN; and
a PUK;
wherein the device is issued using a method for issuance of a personalized user device, wherein the method comprises:
initializing a user device to provide an initialized user device, wherein initializing comprises:
generating a device key pair comprising a public device key and a private device key and storing the private device key in the user device;
generating an issuer authentication key pair comprising a public issuer authentication key and a private issuer authentication key and storing the private issuer authentication key in the user device;
generating a serial number and storing the serial number in the user device; and
injecting a public issuer key into the user device;
wherein the user device comprises a true random number generator and wherein the device key pair and/or the issuer authentication key pair are generated using the true random number generator;
providing device initialization data to an issuer system, wherein the device initialization data comprises the public device key and the public issuer authentication key;
the issuer system generating a device authentication key pair comprising a public device authentication key and a private device authentication key;
calculating a user private key configured to digitally sign data elements;
encrypting the user private key and the public device authentication key with the public device key to provide encrypted data;
digitally signing the encrypted data using a private issuer key associated with the public issuer key to provide signed encrypted data;
the issuer system providing personalization device data, wherein the personalization device data comprises the encrypted data and the signed encrypted data;
injecting the encrypted data and the signed encrypted data into the initialized user device to provide the personalized user device; and
the personalized user device validating the signed encrypted data using the public issuer key and when successful decrypting the encrypted data to retrieve the user private key and the public device authentication key.

* * * * *